US008645315B2

(12) United States Patent
Imai

(10) Patent No.: US 8,645,315 B2
(45) Date of Patent: Feb. 4, 2014

(54) BOOKMARK EXTRACTING APPARATUS, METHOD AND COMPUTER PROGRAM

(75) Inventor: Shoko Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/312,404

(22) Filed: Dec. 6, 2011

(65) Prior Publication Data

US 2012/0150857 A1  Jun. 14, 2012

(30) Foreign Application Priority Data

Dec. 14, 2010 (JP) ................................ 2010-278012

(51) Int. Cl.
*G06F 17/30* (2006.01)

(52) U.S. Cl.
USPC ............ 707/602; 707/730; 707/758; 707/771

(58) Field of Classification Search
USPC ................................................ 707/602, 758
See application file for complete search history.

(56) References Cited

U.S. PATENT DOCUMENTS

| 6,321,228 B1 * | 11/2001 | Crandall et al. ....................... 1/1 |
| 2004/0205501 A1 * | 10/2004 | Gupta ......................... 715/501.1 |
| 2005/0216823 A1 * | 9/2005 | Petersen et al. ............ 715/501.1 |
| 2009/0063265 A1 * | 3/2009 | Nomula .......................... 705/14 |
| 2011/0099186 A1 * | 4/2011 | Zohar et al. .................... 707/758 |
| 2011/0289078 A1 * | 11/2011 | Woodard et al. .............. 707/723 |

FOREIGN PATENT DOCUMENTS

| JP | 2004070441 A | 3/2004 |
| JP | 2007299170 A | 11/2007 |

OTHER PUBLICATIONS

PHPClasses, "CR Referrer, Extract Search Engine Keywords From Referrer URL", Mar. 2004, pp. 1-2.*

* cited by examiner

*Primary Examiner* — Son T Hoang
(74) *Attorney, Agent, or Firm* — Sughrue Mion, PLLC

(57) ABSTRACT

A bookmark extracting apparatus accurately selects the most suitable bookmarks related to a website, being browsed at present, from bookmarks registered in advance. The bookmark extracting apparatus provides the selected bookmarks to a user. It includes a keyword extraction unit which extracts a keyword based on browsing history information of a website up to now, and a providing unit which provides a bookmark related to the keyword extracted by the extraction unit from a plurality of registered bookmarks, based on the keyword.

12 Claims, 22 Drawing Sheets

Fig. 7

| ID | URL | SEARCH WORD EXTRACTING METHO |
|---|---|---|
| 1 | http://www.google.co.jp/search | query:q:+ |
| 2 | http://search.yahoo.co.jp/search | query:p:+ |
| | | |

50 SEARCH SITE INFORMATION

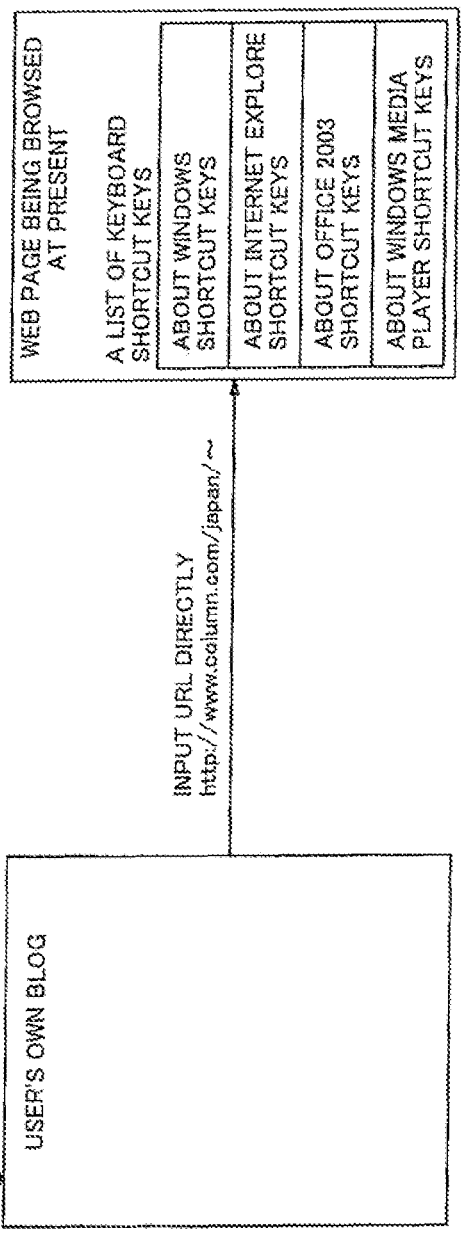
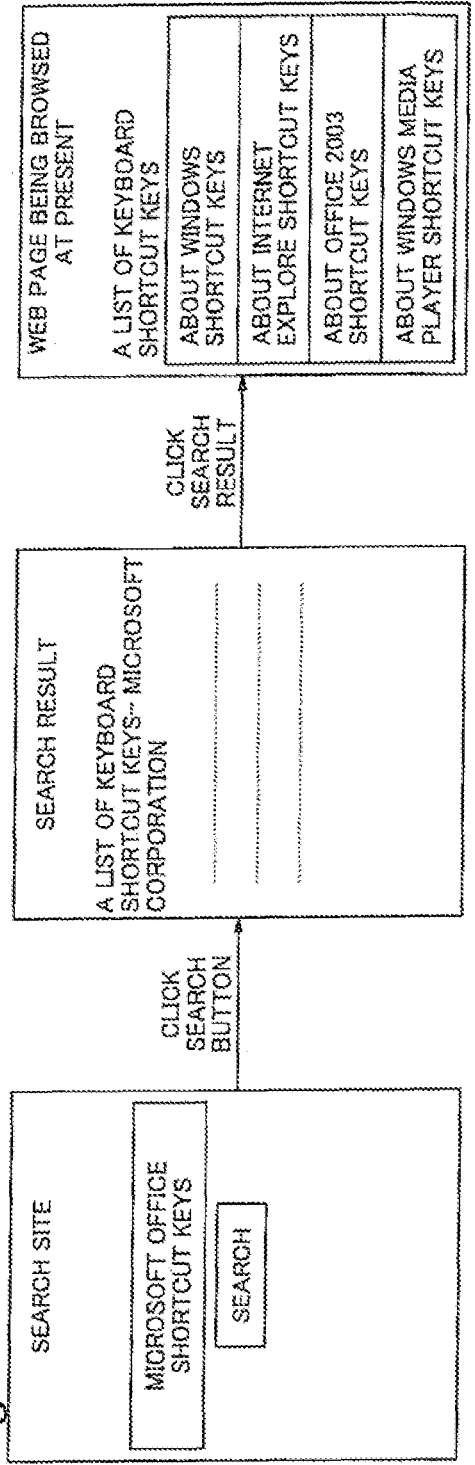

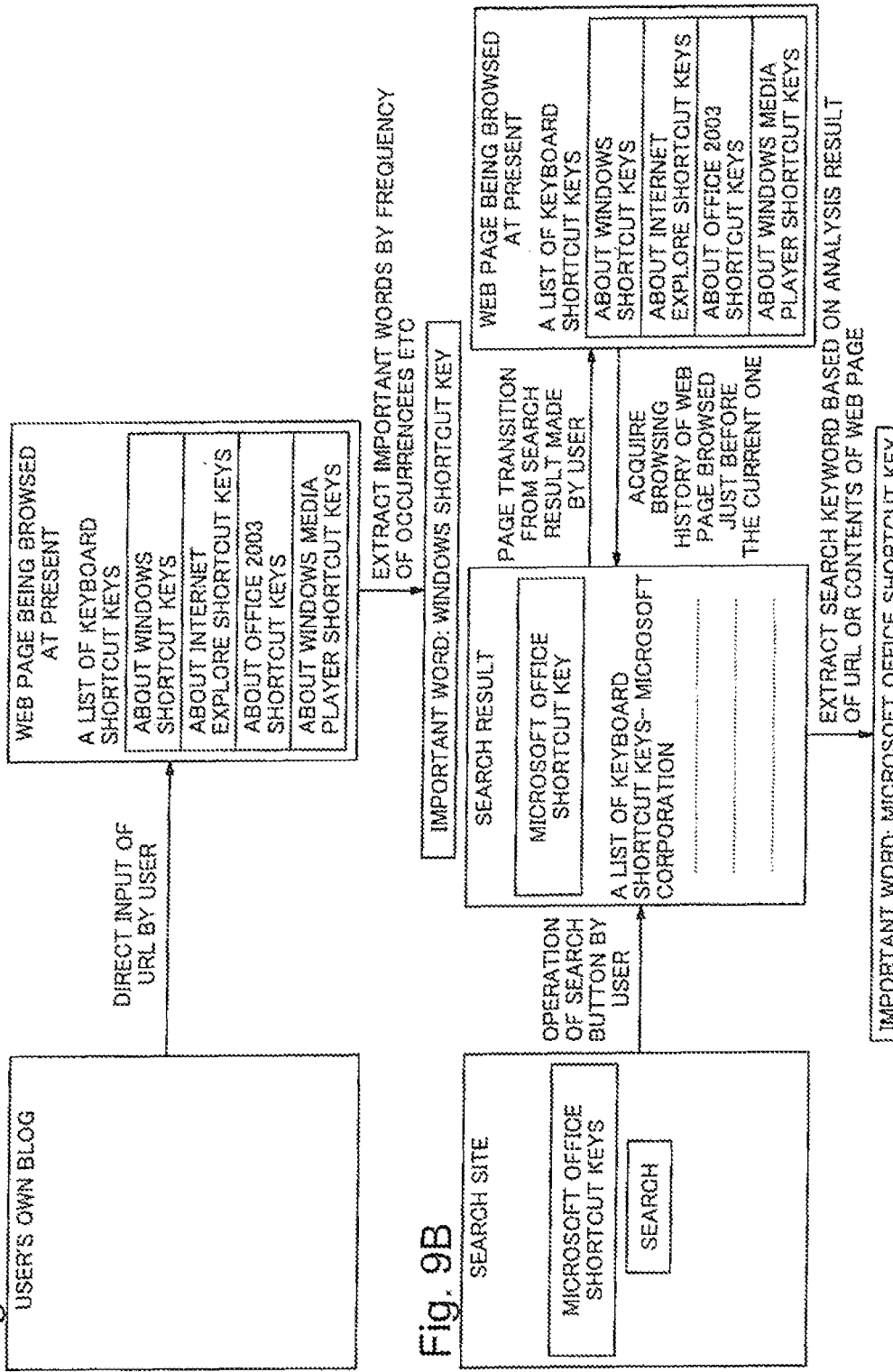

Fig. 11

| RELATED BOOKMARKS FOR "WINDOWS SHORTCUT KEY" | WEB PAGE BEING BROWSED AT PRESENT |
|---|---|
| BOOKMARK 1 | A LIST OF KEYBOARD SHORTCUT KEYS |
| BOOKMARK 2 | ABOUT WINDOWS SHORTCUT KEYS |
| BOOKMARK 3 | |
| BOOKMARK 6 | ABOUT INTERNET EXPLORE SHORTCUT KEYS |
| | ABOUT OFFICE 2003 SHORTCUT KEYS |
| | ABOUT WINDOWS MEDIA PLAYER SHORTCUT KEYS |

Fig. 16

| | |
|---|---|
| RELATED BOOKMARKS OF "WINDOWS SHORTCUT KEY" | WEB PAGE BEING BROWSED AT PRESENT |
| (RANK 1) BOOKMARK 1 | A LIST OF KEYBOARD SHORTCUT KEYS |
| (RANK 2) BOOKMARK 5 | ABOUT WINDOWS SHORTCUT KEYS |
| (RANK 3) BOOKMARK 3 | ABOUT INTERNET EXPLORE SHORTCUT KEYS |
| POSSIBILITY OF CHANGE IN CONTENTS AFTER REGISTRATION | ABOUT OFFICE 2003 SHORTCUT KEYS |
| BOOKMARK 3 | |
| LINK BROKEN | ABOUT WINDOWS MEDIA PLAYER SHORTCUT KEYS |
| BOOKMARK 2 | |

BOOKMARK EXTRACTING APPARATUS, METHOD AND COMPUTER PROGRAM

This application is based upon and claims the benefit of priority from Japanese Patent Application No. 2010-278012, filed on Dec. 14, 2010, the disclosure of which is incorporated herein in its entirety by reference.

TECHNICAL FIELD

The present invention relates to browsing technology of a website. In particular, the present invention relates to browsing technology of a website which provides the most suitable bookmarks to a user from a plurality of registered bookmarks at the time of browsing a website.

BACKGROUND ART

Browsing a website of the Internet (hereinafter, it may be called "Web site", or "Web page") using a browser (browsing software) is widely spread among people. A general browser has a so-called bookmark function. According to the bookmark function, by storing URL (Uniform Resource Locator) of a Web page that a user desires in the browser in a manner being associated with a title that the user desires, easy access to the desired Web page by the user can be realized from the next time. However, in general, when a browser is used for a prolonged period of time, the number of bookmarks registered with the browser tends to be increased. In such bookmark function, there is also known a function in which, assuming the above mentioned situation, a user itself classifies (organizes) Web pages into folders to which names desired by the user are given.

However, in an actual use scene of such browser, the larger number of bookmarks have been registered in advance, the more difficult it will be for a user to access a bookmark corresponding to a desired Web page immediately. This tendency occurs similarly even when classifying the bookmarks by registering in classified folders. As a result of this, a situation in which, even if a large number of bookmarks are registered with a browser, most of the bookmarks are not utilized effectively arises.

There is also known a browser having a function to search for a desired bookmark from a plurality of registered bookmarks. However, in order to make full use of such searching function, a user is necessary to remember a fact that a desired bookmark has been registered before, and, further, is necessary to remember the title or the like of the desired bookmark to use it as a search keyword. For this reason, such searching function is not easy for a user to use it effectively, and thus it is not convenient.

Accordingly, in order to improve convenience of such a general browser function and its bookmark function, a technology by which bookmarks a user would want to access are indicated in an easily accessible (operable) place on a browser screen according to a situation of the user has been proposed. As an example of such technology, in patent document 1 (Japanese Patent Application Laid-Open No. 2007-299170), there is disclosed a technology that, in order to facilitate effective use of bookmarks registered massively, extracts bookmarks related to an item that a user wants to know based on the URL of a Web page which is being browsed at present and provides them to the user.

That is, patent document 1 discloses a technology which acquires a bookmark related to a Web page being browsed at present from a management database in which a URL and a bookmark related to the contents of the URL are associated.

That is, in patent document 1, such management database is prepared by a third person different from a user in advance. As a result of inquiring the URL of a Web page which is being browsed at present to the management database, the user acquires a related URL group. Then, in patent document 1, if bookmarks falling into the acquired URL group have been registered with the bookmark of the browser which the user uses, a list of these bookmarks is provided to the user.

In patent document 2 (Japanese Patent Application Laid-Open No. 2004-070441), there is disclosed a technology in which, for the purpose of providing contents of a Web page useful for a user at the most suitable timing, the most suitable bookmarks are provided from registered bookmarks according to time and a position of a user.

However, in the technology disclosed in patent document 1, registration of data to the management database is performed in advance. Accordingly, information that has been registered is information always older than that of user's access timing. For this reason, in the technology disclosed by patent document 1, it cannot deal with a change in bookmarks and a change in contents of a related URL immediately. Also, in automatic extraction of a bookmark based on contents of a Web page only, a bookmark different from a user's desire may be extracted such as when information that the user want to know is indicated only on a small part of the Web page.

Further, in the technology disclosed by patent document 1, association of a URL by usage classification is performed. For this reason, depending on setting of usage classification, there is also a possibility that classification which does not correspond to contents of a Web page is performed.

In the technology disclosed in patent document 2, the contents of a Web page which a user is browsing at present are not considered in bookmarks provided to the user.

Accordingly, a main object of the present invention is to provide a bookmark extracting apparatus and the like which selects the most suitable bookmarks related to a website being browsed at present accurately from bookmarks registered in advance and provides them to a user.

SUMMARY OF THE INVENTION

In order to achieve this object, a bookmark extracting apparatus according to the present invention has the following configuration.

That is, as one of the aspect of the present invention, a bookmark extracting apparatus includes:

a keyword extraction unit to extract a keyword based on browsing history information of a website up to now; and a providing unit to provide, from a plurality of registered bookmarks, a bookmark related to the keyword extracted by the keyword extraction unit based on the keyword.

In the above-mentioned case, based on information about a website browsed at present included in the browsing history information, the keyword extraction unit may acquire contents of the website and extract the keyword from the contents, for example.

As another aspect of the present invention, in the above-mentioned bookmark extracting apparatus, when, by analyzing the browsing history information, determining that transition to a website browsed at present has been made from a search site, the keyword extraction unit may extract search keyword which has been used before the transition to the website as the keyword; and the providing unit may provide, from the plurality of bookmarks, a bookmark related to the search keyword based on the search keyword.

In any of the above-mentioned configurations, the providing unit may include a relevance determination unit to determine presence of relevance between the keyword and each of the bookmarks according to a degree that the keyword is included in the attribute information of each of the bookmarks included in information about the plurality of bookmarks, for example.

Meanwhile, this object is also achieved by a bookmark extracting method corresponding to a bookmark extracting apparatus including each of the aforementioned configurations.

The object is also achieved by a computer program which realizes bookmark extracting apparatus and corresponding methods having aforementioned configurations using a computer, and by a computer-readable storage medium in which the computer program is stored.

According to the present invention, provision of a bookmark extracting apparatus etc, which selects the most suitable bookmarks related to a website being browsed at present accurately from bookmarks registered in advance and provides them to a user is realized.

BRIEF DESCRIPTION OF THE DRAWINGS

Exemplary features and advantages of the present invention will become apparent from the following detailed description when taken with the accompanying drawings in which:

FIG. 7 is a diagram illustrating search site information held in a search site information storing unit 106 on a conceptual basis;

FIG. 8A and FIG. 8B are diagrams exemplarily describing screen transition on the occasion of web browsing by a user in an example of the second exemplary embodiment of the present invention.

FIG. 9A and FIG. 9B are diagrams conceptually describing operations of a bookmark extracting system in the case of screen transition illustrated in FIG. 8A and FIG. 8B;

FIG. 11 is a diagram exemplifying a display form of a list screen of related bookmarks in the second exemplary embodiment of the present invention;

FIG. 16 is a diagram exemplifying a display form of a list screen of related bookmarks in the fourth exemplary embodiment of the present invention.

EXEMPLARY EMBODIMENT

Next, exemplary embodiments for carrying out the present invention will be described in detail with reference to the drawings.

The First Exemplary Embodiment

Figure 1:
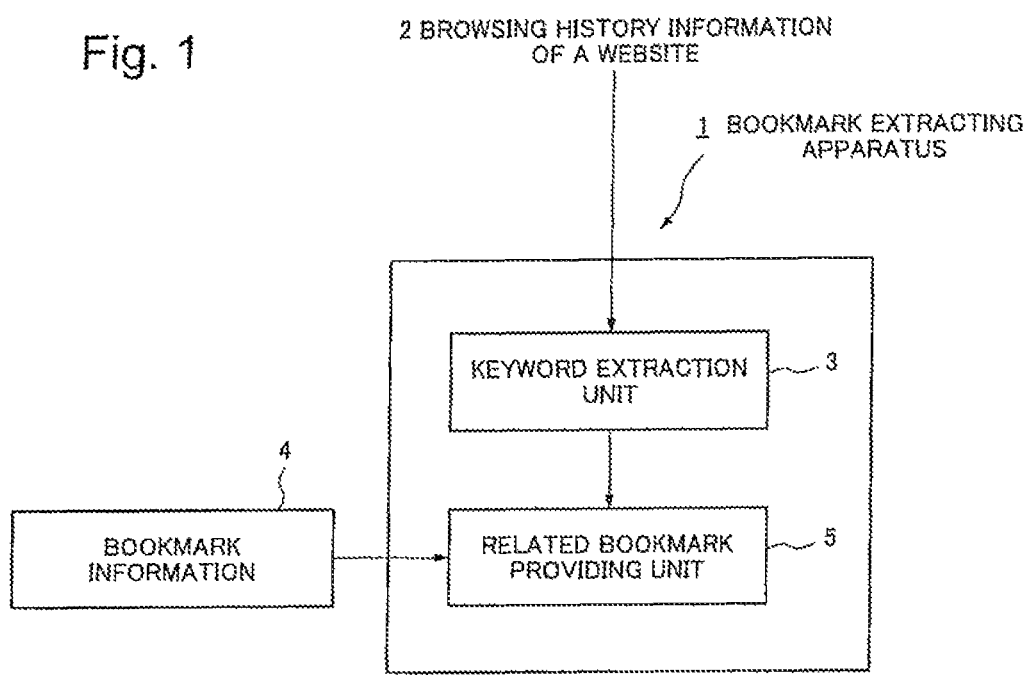
FIG. 1 is a block diagram illustrating a structure of a bookmark extracting apparatus according to a first exemplary embodiment of the present invention.

FIG. 1 is a block diagram illustrating a structure of a bookmark extracting apparatus according to the first exemplary embodiment of the present invention. A bookmark extracting apparatus 1 shown in FIG. 1 has a keyword extraction unit 3 and a related bookmark providing unit 5.

That is, the keyword extraction unit 3 extracts keywords based on browsing history information 2 up to now for a Web site (Web page). The browsing history information 2 includes information about a Web site being browsed at present.

The related bookmark providing unit 5 selects from a plurality of pieces of registered information about bookmarks (bookmark information) 4 a bookmark related to the keywords extracted by the keyword extraction unit 3 based on the keywords. Then, the related bookmark providing unit 5 provides (or, reports) selected bookmarks to a user. The browsing history information 2 and the bookmark information 4 may be obtained from a web browser (web browsing apparatus) not illustrated in FIG. 1, for example. Although, as a form of providing such selected bookmarks, indication on a display (not shown in FIG. 1, but, in an example mentioned later, a display 12 of a computer 1000 shown in FIG. 17 can be adopted) is assumed, for example, it is not limited to the indication.

According to the first exemplary embodiment described above, it is possible to select the most suitable bookmarks related to a Web site being browsed at present accurately from bookmarks registered in advance to provide it to a user. That is, in the bookmark extracting apparatus 1 according to this exemplary embodiment, the keyword extraction unit 3 extracts keywords based on the browsing history information 2 on Web sites that have been browsed to date, the information 2 including information on the Web site being browsed at present. Then, by referring to the extracted keywords, the bookmark extracting apparatus 1 selects bookmarks related to the keywords and provides the selected bookmarks to a user. As a result, even when a user does not remember each bookmark due to there being a lot of registered bookmarks, or, even when a user has forgotten with which category a bookmark has been registered because bookmarks have been registered by classifying them into categories, the bookmark extracting apparatus 1 can provide the most suitable bookmarks related to a Web site being browsed at present to the user.

The Second Exemplary Embodiment

Figure 2:
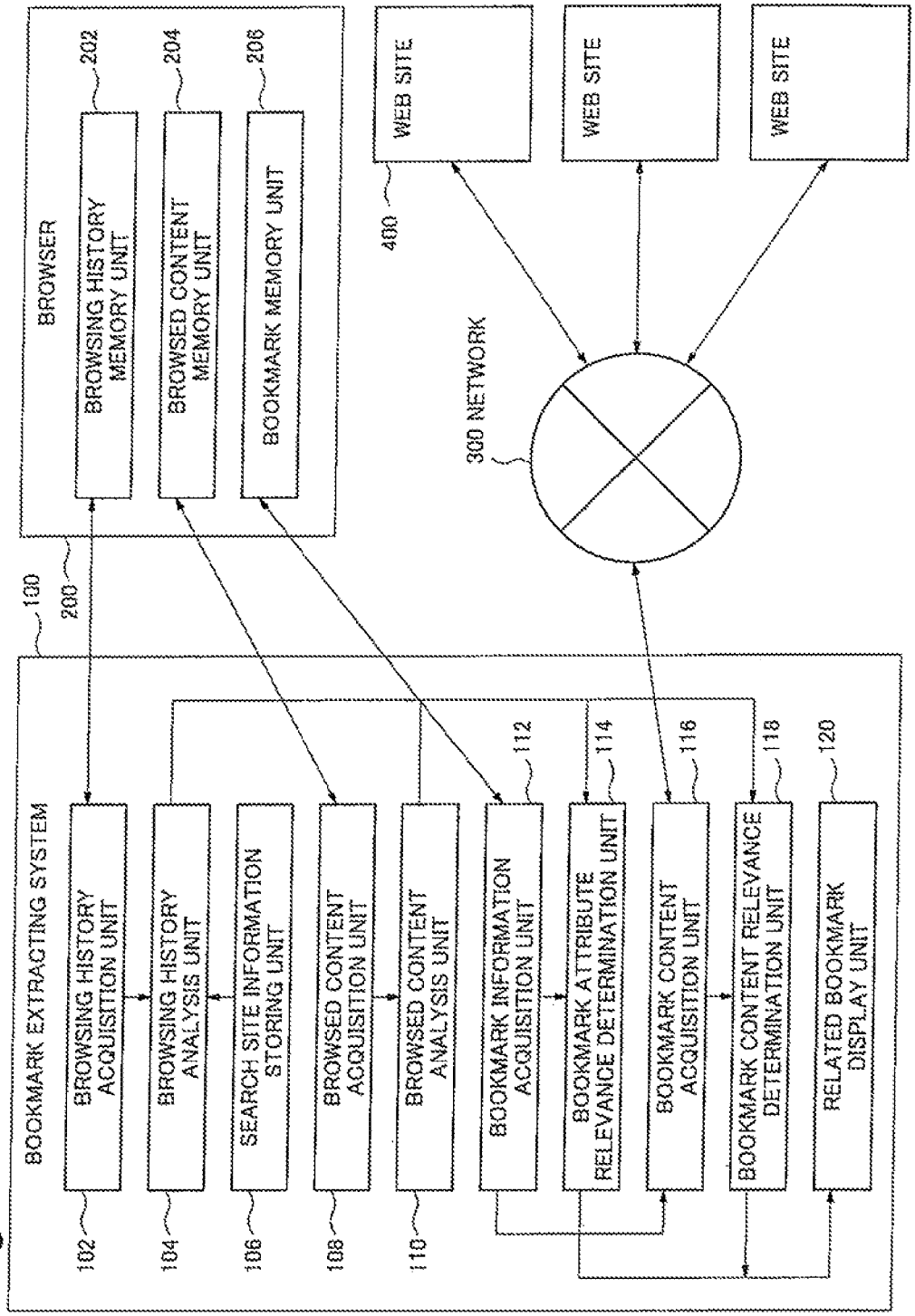
FIG. 2 is a block diagram exemplifying a communication environment including a bookmark extracting system according to a second exemplary embodiment of the present invention.

Next, the second exemplary embodiment based on the first exemplary embodiment mentioned above will be described in detail with reference to a drawing. FIG. 2 is a block diagram exemplifying a communication environment including a bookmark extracting system according to the second exemplary embodiment of the present invention. A communication environment shown in FIG. 2 includes the bookmark extracting system 100, the browser 200, a network 300 and a Web site 400.

The bookmark extracting system 100 and the Web site 400 can communicate via a communication network (hereinafter, simply referred to as a "network") 300 such as the Internet. In this exemplary embodiment, it is supposed that the Web site 400 is a link destination of a bookmark that has been registered with the browser 200 in advance. In FIG. 2, the bookmark extracting system 100 and the browser 200 can be considered as a configuration of software programs executed in a single information processing apparatus (computer) shown in FIG. 17, for example (detailed description will be made later with reference to FIG. 17). However, the bookmark extracting system 100 and the browser 200 may be realized separately by information processing apparatus of physically or virtually different bodies from each other which can communicate mutually.

(The Bookmark Extracting System 100)

The bookmark extracting system 100 has a browsing history acquisition unit 102, a browsing history analysis unit 104, the search site information storing unit 106, a browsed content acquisition unit 108, a browsed content analysis unit 110, a bookmark information acquisition unit 112, a bookmark attribute relevance determination unit 114, a bookmark content acquisition unit 116, a bookmark content relevance determination unit 118 and a related bookmark display unit 120. The bookmark extracting system 100 corresponds to the bookmark extracting apparatus 1 in the first exemplary embodiment mentioned above.

That is, in the bookmark extracting system 100, the browsing history acquisition unit 102 acquires a browsing history of a Web site (it corresponds to the browsing history information 2 of a Web site in the first exemplary embodiment) from the browser 200. The search site information storing unit 106 holds the URL of a search site and an extracting method of a search word in the search site such as search site information 50 illustrated in FIG. 7. By analyzing a browsing history obtained from the browsing history acquisition unit 102 based on search site information obtained from the search site information storing unit 106, the browsing history analysis unit 104 extracts keywords that have been used at the time of searching. The browsed content acquisition unit 108 acquires contents of a Web site being browsed in the browser 200 from the browser 200. By analyzing the contents of the Web site obtained from the browser 200 via the browsed content acquisition unit 108, the browsed content analysis unit 110 extracts keywords about the Web site. The bookmark information acquisition unit 112 acquires bookmark information being registered with the browser 200 from the browser 200.

In the bookmark extracting system 100, the bookmark attribute relevance determination unit 114 determines relevance between an attribute AT of a bookmark acquired via the bookmark information acquisition unit 112 and the keywords extracted by the browsing history analysis unit 104 or by the browsed content analysis unit 110. Here, the "attribute AT of a bookmark" is detailed information (attribute information) including a character string and the like about a bookmark such as the title and the URL of a Web site registered as the bookmark and a pass of a folder (hereinafter, the same meaning shall apply). The bookmark content acquisition unit 116 acquires the contents of the Web site 400 (the link destination URL) represented by a bookmark acquired via the bookmark information acquisition unit 112 from the Web site 400 via the network 300. Targeting the contents acquired via the bookmark content acquisition unit 116, the bookmark content relevance determination unit 118 determines relevance with the keywords extracted by the browsing history analysis unit 104 or the browsed content analysis unit 110. Then, the related bookmark display unit 120 provides bookmarks determined by the bookmark attribute relevance determination unit 114 and the bookmark content relevance determination unit 118 as having relevance (hereinafter, they may be referred to as "related bookmarks") to the user by indicating them in the screen in which the browser 200 is indicated, for example.

(The Browser 200)

The browser 200 has a function to indicate contents of various Web sites including the Web site 400 so that they can be read by a user. This browser 200 has a browsing history memory unit 202, a browsed content memory unit 204 and the bookmark memory unit 206.

That is, about a Web site which a user has browsed, the browsing history memory unit 202 holds a browsing history (browsing history information) such as the URL of the Web site. The browsed content memory unit 204 holds the contents of a Web site which a user is browsing at present. The bookmark memory unit 206 holds information on the bookmark of a desired Web site which the user has registered (bookmark information: it corresponds to the bookmark information 4 in the first exemplary embodiment) (refer to FIGS. 10A-10F). The bookmark memory unit 206 holds, as bookmark information, a name (title) representing a bookmark being registered, and the URL and the attribute information of a Web site corresponding to the bookmark. Meanwhile, the bookmark memory unit 206 may hold additional information such as a tag and a keyword about a registered bookmark further.

(Description of an Operation)

Next, an operation of this exemplary embodiment having an aforementioned configurations will be described in detail.

Figure 3:
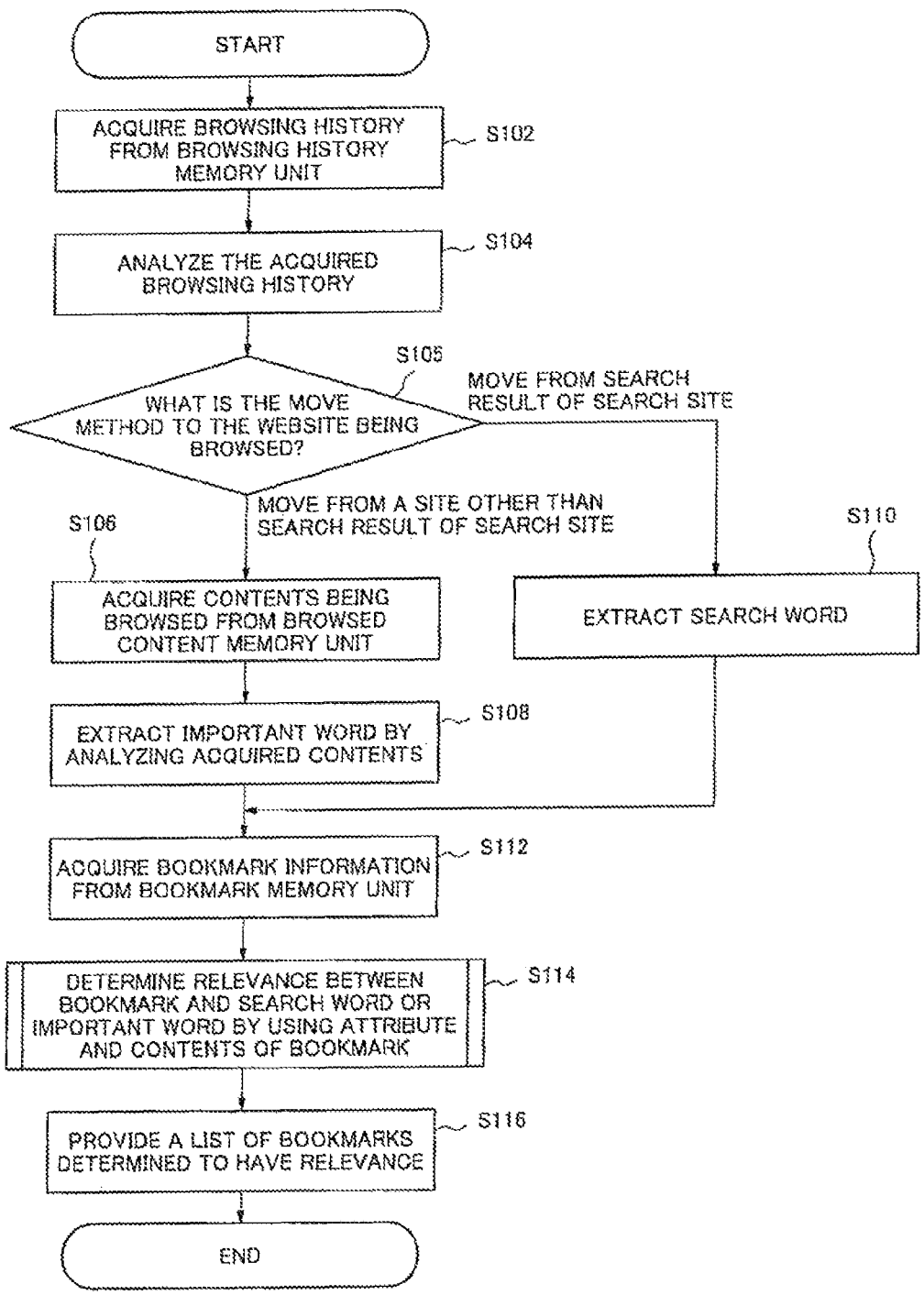
FIG. 3 is a flow chart illustrating bookmark extraction processing by a bookmark extracting system 100 according to the second exemplary embodiment of the present invention.

FIG. 3 is a flow chart showing a bookmark extraction processing by the bookmark extracting system 100 according to the second exemplary embodiment of the present invention. The bookmark extracting system 100 according to this exemplary embodiment begins to operate in response to a user accessing a desired Web page using the browser 200. That is, bookmark extraction processing according to this exemplary embodiment begins in response to detecting access to a Web page in the browser 200.

When access to a Web page is detected, the browsing history acquisition unit 102 acquires a browsing history from the browsing history memory unit 202 of the browser 200 (Step S102). Next, the browsing history analysis unit 104 analyzes the browsing history acquired at Step S102 (Step S104). Then, the browsing history analysis unit 104 determines whether the Web page being browsed at present by the browser 200 is a page to which a move (transition or arrival) has been made directly from a page which indicates a search result indicated in a search site or not based on an analysis result (Step S105).

As a result of the determination in Step S105, when the Web page being browsed at present is not a move from the search site, the browsed content acquisition unit 108 performs extraction processing (a first search process) of keywords based on the contents of the Web page (Step S106). That is, in Step S106, the browsed content acquisition unit 108 acquires the contents of the Web page which the user is browsing at present from the browsed content memory unit 204 of the browser 200. Then, by analyzing the contents acquired at Step S106, the browsed content analysis unit 110 extracts an important word included in the contents of the Web page as a keyword (Step S108). In the extraction processing of an important word, whether a certain word is an important word or not may be performed based on the frequency of occurrence (usage count) of the word in the Web page, for example (it may be performed by other methods, and, hereinafter, the same shall apply).

On the other hand, when the Web page is of a move from a search site, the browsing history analysis unit 104 performs extraction processing of keywords (the second search process) based on a browsing history (Step S110).

Meanwhile, description of analysis processing of a browsing history by the browsing history analysis unit 104 (Step S102, Step S104 and Step S105), and extraction processing of keywords based on a browsing history (Step S110) will be made later with reference to FIG. 4.

In Step S112 and Step S114, using keywords obtained by the above-mentioned one of pieces of keyword extraction processing, bookmarks related to the keywords are extracted. That is, the bookmark information acquisition unit 112 acquires information (bookmark information) about bookmarks registered with the browser from the bookmark memory unit 206 of the browser 200 (Step S112). Next, in Step S114, a determination processing of relevance between the keywords and the bookmark information is performed. This determination processing is realized by the bookmark attribute relevance determination unit 114, the bookmark content acquisition unit 116 and the bookmark content relevance determination unit 118 (detailed description will be made later with reference to FIG. 5).

After determination on relevance is completed at Step S114, the related bookmark display unit 120 provides a list of related bookmarks to the user by a display form shown in FIG. 11, for example (Step S116).

FIG. 11 is a diagram exemplifying a display form of a list screen of related bookmarks in the second exemplary embodiment of the present invention. The example shown in FIG. 11 indicates a state that a list of bookmarks related to a Web page is indicated in the left side frame of the Web page being indicated currently by a function of the browser 200.

Here, an operation of the browsing history analysis unit 104 will be described with reference to FIG. 4. FIG. 4 is a flow chart showing details of the processing in Step S102, Step S104, Step S105 and Step S110 shown in FIG. 3 included in the bookmark extraction processing according to the second exemplary embodiment.

First, the browsing history analysis unit 104 acquires history information representing a history until a Web page which the user is browsing at present has been reached (a history corresponding to the Web page) from browsing history information stored in the browsing history memory unit 202 of the browser 200 (Step S202).

Next, by referring to the history information acquired at Step S202, the browsing history analysis unit 104 determines whether the Web page being browsed at present is a search site (Step S204). Here, as a method for determining whether it is a search site or not in Step S204, a procedure that is general nowadays such as processing of pattern matching and the like with the URL of a search site stored in advance can be adopted, for example. Description of a specific example of such procedure will be made later with reference to FIG. 5.

When it is determined that the Web page being browsed at present is a search site, the browsing history analysis unit 104 extracts a search word which the user has inputted to the search site (Step S210). On the other hand, when it is determined that the Web page being browsed at present is not a search site, the browsing history analysis unit 104 acquires history information about a Web page which has been browsed just before the Web page being browsed at present from the browsing information acquired at Step S202 (Step S206). Then, by referring to the history information acquired at Step S206, the browsing history analysis unit 104 determines whether the Web page browsed just before the current one is a search site or not (Step S208). In determination processing in Step S208, the same general processing procedure as Step S204 mentioned above can be adopted.

Figure 4:
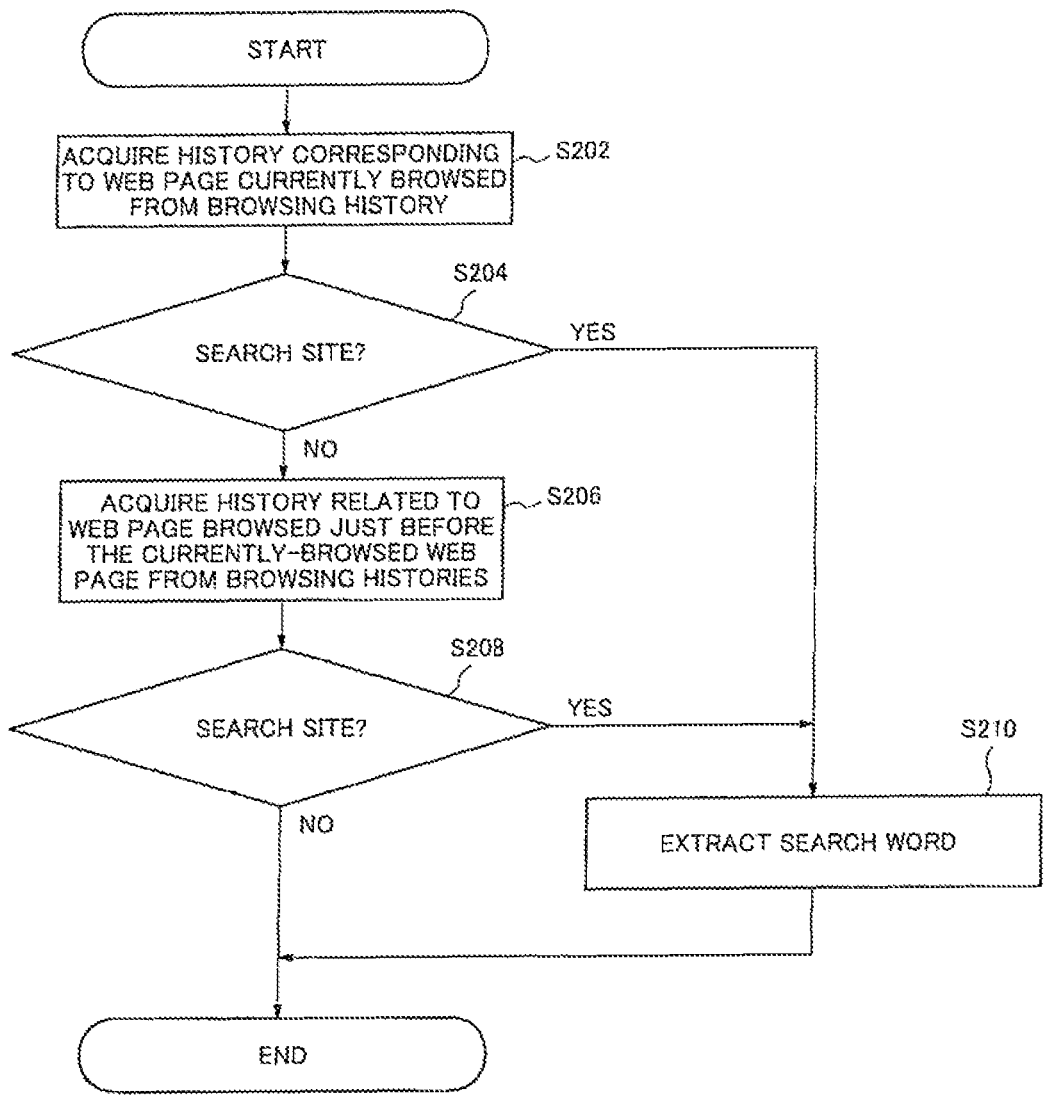
FIG. 4 is a flow chart illustrating details of processing in Step S102, Step S104, Step S105 and Step S110 indicated in FIG. 3 within bookmark extraction processing according to the second embodiment.
Figure 5:
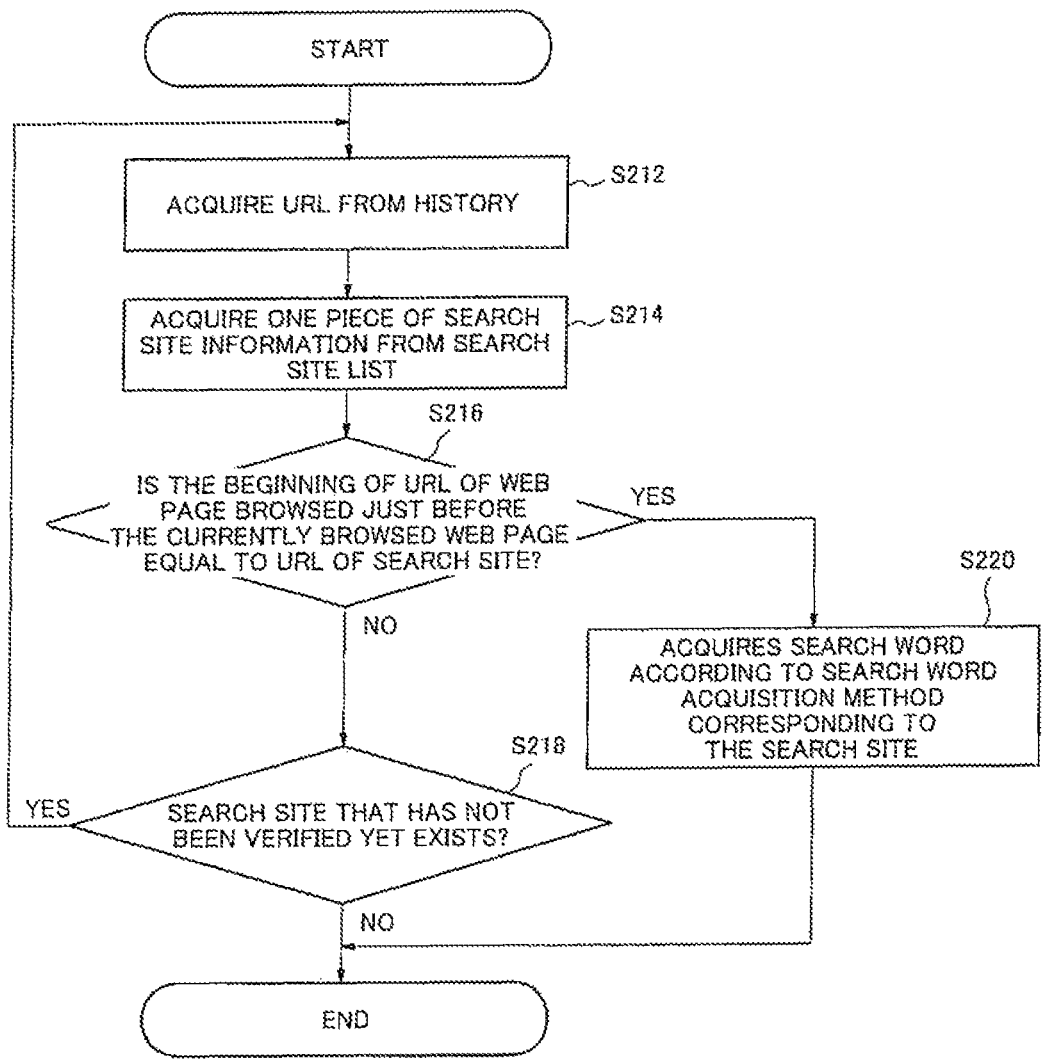
FIG. 5 is a flow chart illustrating determining processing for a single history about whether it is of a search site or not, and extraction processing of a search word according to the second embodiment.

FIG. 5 is a flow chart showing determination processing of whether it is a search site or not targeting a single history, and extraction processing of a search word according to the second exemplary embodiment, and indicating a part of (Steps S204-S210) the series of processing shown in FIG. 4 described above more in detail.

The browsing history analysis unit 104 acquires a URL which is included in the history information acquired at Step S202 shown in FIG. 4 (Step S212). Next, the browsing history analysis unit 104 acquires a piece of search site information from the search site information storing unit 106 (Step S214).

Targeting the Web page which has been browsed just before the Web page being browsed at present, the browsing history analysis unit 104 determines whether the beginning of a URL is equal to the URL of a search site represented by the search site information acquired at Step S214 (Step S216).

When it has been determined that it is equal to the search site in the determination in Step S216, the browsing history analysis unit 104 acquires a search word according to a search word acquisition method corresponding to the search site (Step S220). On the other hand, when it is determined that it is not equal to the search site, the browsing history analysis unit 104 determines whether a search site that has not been verified yet remains in the search site information stored in the search site information storing unit 106 (Step S218). When there is a non-verified search site found in this determination, processing returns to Step S214. On the other hand, when it is determined that there is no non-verified search site, the browsing history analysis unit 104 ends this processing.

Meanwhile, because information on a search site held in the search site information storing unit 106 depends on implementation of a search site, it needs periodic update. As such update, there can be considered: an automatic correction by a periodic information delivery by the distributer of the system; sharing of search site information; and a manual correction by a user.

Next, details of relevance determining processing involving a combination of the bookmark attribute relevance determination unit 114, the bookmark content acquisition unit 116 and the bookmark content relevance determination unit 118 will be described with reference to FIG. 6.

Figure 6:
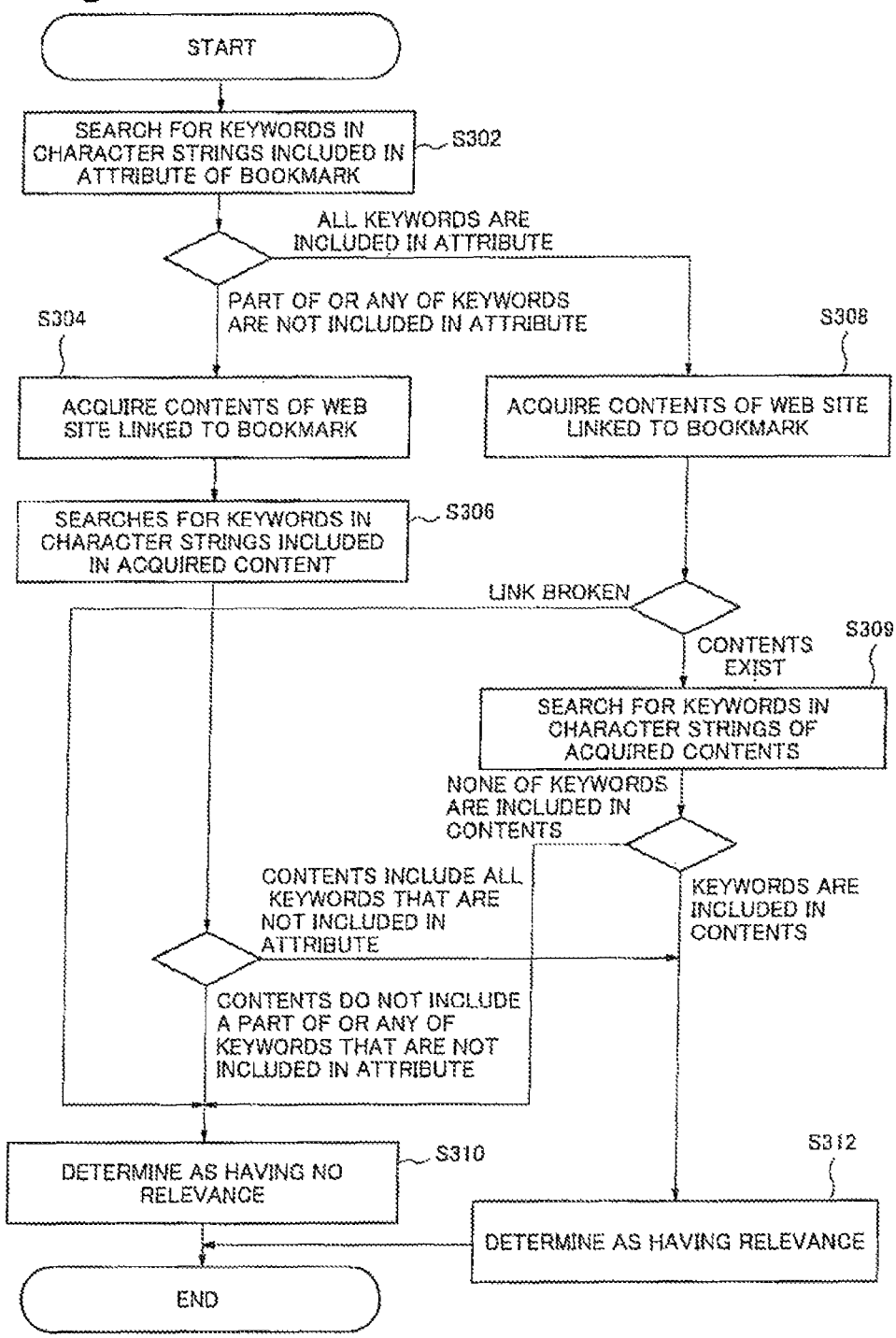
FIG. 6 is a flow chart illustrating relevance determining processing in the second exemplary embodiment of the present invention.
Figure 10A:
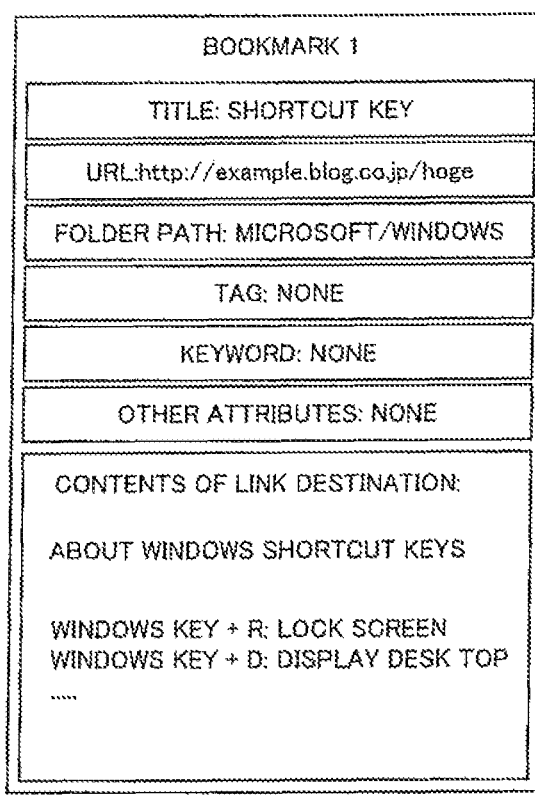
FIG. 10A is a diagram conceptually illustrating data structure of a bookmark 1 among pieces of bookmark information about a plurality of bookmarks registered with a bookmark memory unit 206 of a browser 200.
Figure 10B:
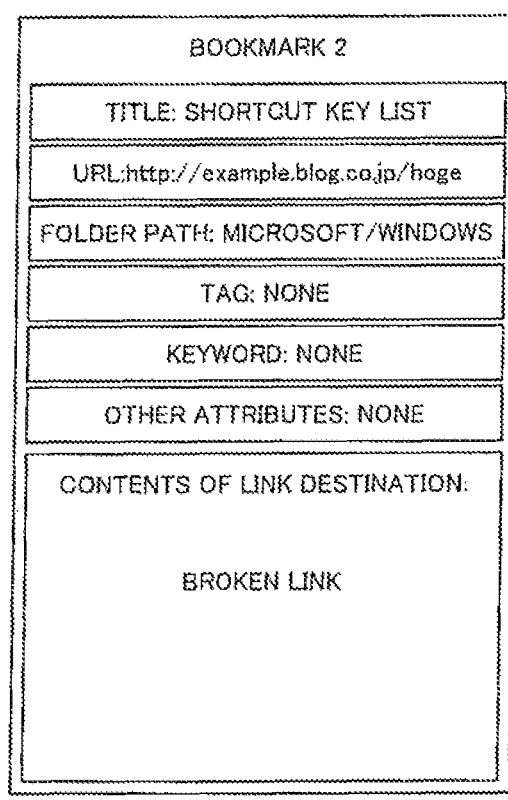
FIG. 10B is a diagram conceptually illustrating data structure of a bookmark 2 among pieces of bookmark information about a plurality of bookmarks registered with the bookmark memory unit 206 of the browser 200.
Figure 10C:
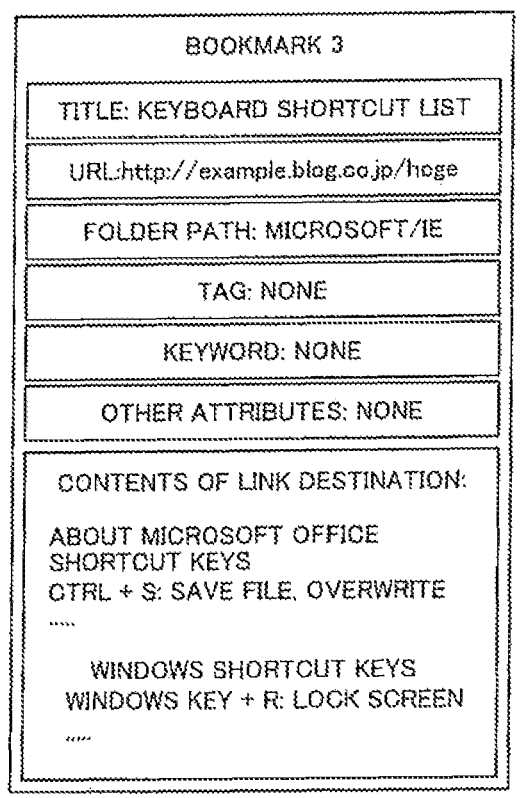
FIG. 10C is a diagram conceptually illustrating data structure of a bookmark 3 among pieces of bookmark information about a plurality of bookmarks registered with the bookmark memory unit 206 of the browser 200.
Figure 10D:
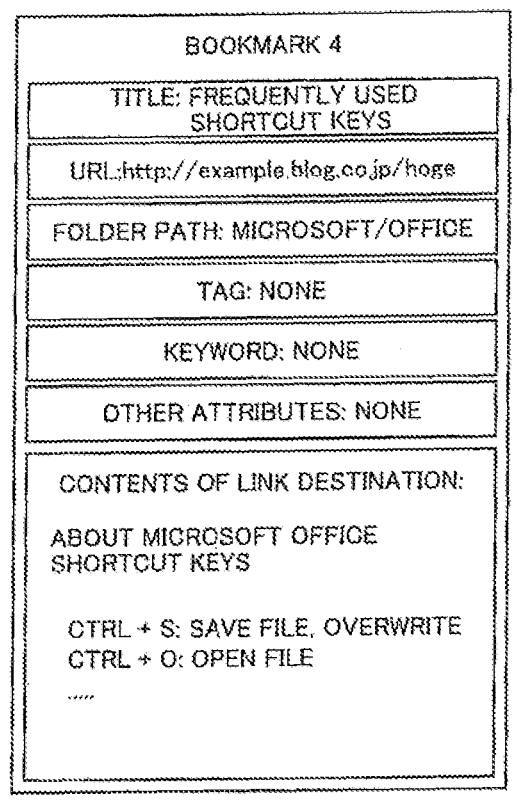
FIG. 10D is a diagram conceptually illustrating data structure of a bookmark 4 among pieces of bookmark information about a plurality of bookmarks registered with the bookmark memory unit 206 of the browser 200.
Figure 10E:
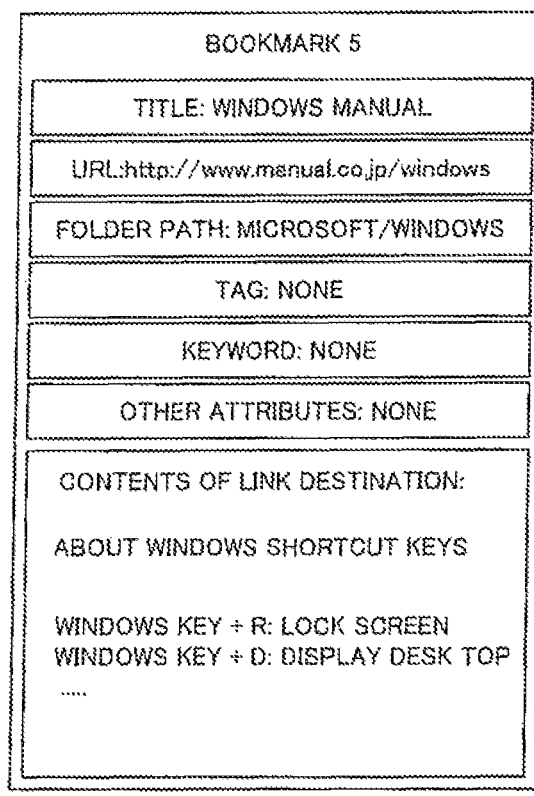
FIG. 10E is a diagram conceptually illustrating data structure of a bookmark 5 among pieces of bookmark information about a plurality of bookmarks registered with the bookmark memory unit 206 of the browser 200.
Figure 10F:
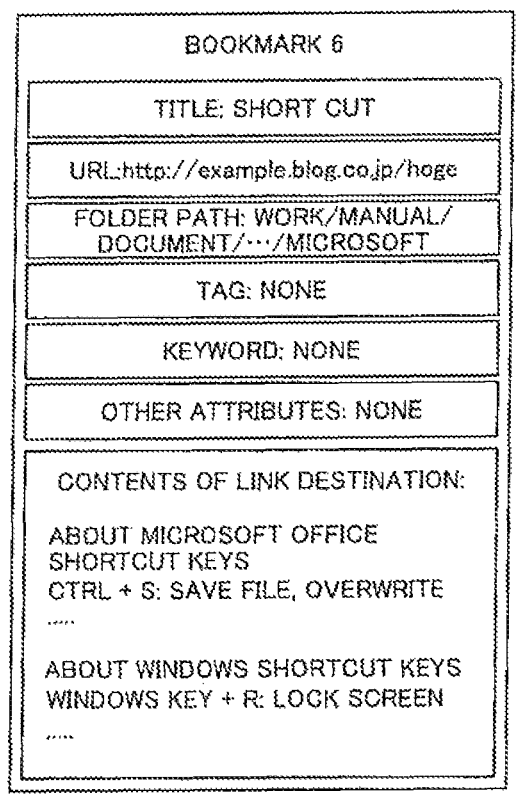
FIG. 10F is a diagram conceptually illustrating data structure of a bookmark 6 among pieces of bookmark information about a plurality of bookmarks registered with the bookmark memory unit 206 of the browser 200.

FIG. 6 is a flow chart showing relevance determining processing in the second exemplary embodiment of the present invention, and indicates details of Step S114 shown in FIG. 3 mentioned above.

First, by referring to the bookmark information acquired by the bookmark information acquisition unit 112 at Step S112 (FIG. 3), the bookmark attribute relevance determination unit 114 carries out search for keywords targeting character strings included in the attribute AT of a bookmark (Step S302). Here, keywords to be searched for in this step are keywords extracted in keyword extraction processing based on contents of a Web page mentioned above (the first search process: Step S106 of FIG. 3) or keyword extraction processing based on a browsing history (the second search process: FIG. 3 (Step S110), FIG. 4 and FIG. 5).

As a result of the search in Step S302, when all keywords exist in the attribute AT of a bookmark, the bookmark content acquisition unit 116 accesses the specific Web site 400 that is the link destination of the bookmark (Step S308). As a result, the bookmark content acquisition unit 116 acquires the contents of the specific Web site 400 via the network 300.

When the contents have been able to be acquired at Step S308, in view of a change in the contents after the time when the bookmark has been registered by a user, the bookmark content relevance determination unit 118 searches for the keywords in character strings of the contents which the bookmark content acquisition unit 116 has acquired (Step S309).

As a result of the search in Step S309, when no smaller than one of the keywords is included, the bookmark content relevance determination unit 118 determines that there is relevance between the specific Web site 400 that is the link destination and the Web site being browsed at present (Step S312). In contrast, when the keywords are not included at all, the bookmark content relevance determination unit 118 determines that there is no relevance between the specific Web site 400 that is the link destination and the Web site being browsed at present (Step S310). Meanwhile, in the case when the specific Web site 400 corresponding to the bookmark is of a broken link, processing is advanced to Step S310. Also in this case, the bookmark content relevance determination unit 118 determines that there is no relevance between the specific Web site 400 that is the link destination and the Web site being browsed at present.

On the other hand, as a result of the search in Step S302, when a part or all of the keywords do not exist in the attribute AT of a bookmark, the bookmark content acquisition unit 116 acquires contents by accessing the Web site 400 that is the link destination of the bookmark via the network 300 as is the case with Step S308 (Step S304). Then, targeting character strings which are included in the acquired contents, the bookmark content relevance determination unit 118 searches for the keywords which have not been included in the attribute AT of the bookmark (Step S306). Meanwhile, in order to reduce the load of processing at that time, processing from acquisition of contents to search of the keywords can be carried out using a search site via the network 300.

As a result of the search in Step S306, when it is determined that all keywords which have not been included in the attribute AT of the bookmark are included in the contents acquired at Step S304, the bookmark content relevance determination unit 118 determines that there is relevance between the specific Web site 400 that is the link destination and the Web site being browsed at present (Step S312).

On the other hand, when a part or all of the keywords which have not been included in the attribute AT of the bookmark are not included in the acquired contents, the bookmark content relevance determination unit 118 determines that there is no relevance between the specific Web site 400 that is the link destination concerned and the Web site being browsed at present (Step S310).

Example

Next, the whole picture of a series of processing steps mentioned above will be described using an concrete example. First, the precondition in this description will be described.

FIG. 8A and FIG. 8B are diagrams which exemplarily describe screen transition on the occasion of web browsing by a user in an example of the second exemplary embodiment of the present invention. FIG. 9A and FIG. 9B are diagrams which conceptually describe an operation of a bookmark extracting system in the case of screen transition illustrated in FIG. 8A and FIG. 8B.

That is, a pattern 1 illustrated in FIG. 8A shows a case where a Web site which is being browsed at present has been reached by inputting the URL of a desired Web site directly in its own blog, for example. On the other hand, a pattern 2 illustrated in FIG. 8B indicates a case where a desired Web site is being browsed at present by obtaining a search result about a desired keyword by inputting the keyword in a search site, and further by making transition to a desired Web site included in the search result.

Meanwhile, in FIG. 8A, FIG. 8B, FIG. 9A and FIG. 9B, "Internet Explorer", "Media Player", "Office", "Windows" are registered trademarks (hereinafter, the same shall apply).

It is assumed that, the information illustrated conceptually in FIG. 7 is referred to as search site information obtained from the search site information storing unit 106. Also, it is assumed that a user has been registered the bookmarks illustrated conceptually in FIGS. 10A to 10F (bookmarks 1 to 6) before. However, it is assumed that this user has become unable to find these bookmarks 1 to 6 any more as a result of registering a great deal of other bookmarks. Or, it is assumed that, because the fact itself that these bookmarks have been registered has been forgotten, this user has become unable to reach these bookmarks easily any more by operation only by the user.

In the examples of bookmark information illustrated in FIGS. 10A to 10F, referring to a folder pass, it can be found that, about most of the bookmarks, the user has organized related bookmarks on a software-by-software basis in a Microsoft (registered trademark) folder. However, only the bookmark 6 (FIG. 10F) is not based on this organizing procedure. As a reason of this, it is assumed a case where a organizing method of a bookmark has been changed at the time of registration of the bookmark 6, or a case when a place for registration has been changed temporarily, for example.

In the case of general technologies under the above-mentioned precondition, in order for a user to reach the bookmark 6, first, it is indispensable that the user itself remembers the fact that the bookmark 6 has been registered. Moreover, the user has no choice but to remember the previous organizing method about the bookmark and look for the bookmark 6 based on this organizing method, or to investigate it by a search. However, when a general bookmark searching function is used and if a keyword to be used is a word such as "Office" and "Windows" (Office and Windows are registered trademarks) related to an item which the user wants to know in the process of page transition illustrated in the pattern 1 (FIG. 8A) and the pattern 2 (FIG. 8B), the bookmark 6 cannot be reached.

In contrast to such general technologies, according to the technology mentioned above in this exemplary embodiment, a user can be encouraged to use a bookmark which has been buried in a large number of bookmarks like the above precondition effectively.

Hereinafter, an operation of the bookmark extracting system 100 corresponding to screen transition illustrated in FIG. 8A and FIG. 8B will be described with reference to FIG. 9A and FIG. 9B.

First, an example in the pattern 1 illustrated in FIG. 9A will be described. The pattern 1 indicates a case where "Web page being browsed" has been reached directly from an "own blog" page, for example, without going through a search site. In the example of this pattern 1, it is assumed that the Web page which the user is browsing at present is a Web page on which a column related to information technology is indicated. It is supposed that, at the time when the user has browsed this Web page before, a special topic of comparison of OSs (Operating Systems) had appeared on the Web page. It is also supposed that, in the current browsing at present, a special topic about a shortcut key is posted on the Web page.

In this case, in the bookmark extracting system 100, the browsing history acquisition unit 102 acquires a browsing history from the browsing history memory unit 202 (Step S102 of FIG. 3). Next, by analyzing the acquired browsing history, the browsing history analysis unit 104 determines whether the Web site which is being browsed at present is a page to which transition (reach) has been made directly from a page of a search result in a search site or not (Step S104 of FIG. 3). In the pattern 1, the transition to the Web site which is being browsed at present is not a transition via a search site. For this reason, as extraction processing of a keyword, the browsed content acquisition unit 108 acquires the contents being browsed from the browsed content memory unit 204 of the browser 200 (Step S106 of FIG. 3).

Next, by analyzing the acquired contents, the browsed content analysis unit 110 extracts an important word in the "Web page which is being browsed" as a keyword (Step S108 of FIG. 3). In the case of the pattern 1 shown in FIG. 9A, it is assumed that "Windows" and "shortcut key" are obtained as such keywords.

In order to extract a bookmark related to the keywords from a plurality of bookmarks which have been already registered, the bookmark information acquisition unit 112 acquires bookmark information from the bookmark memory unit 206 of the browser 200 (Step S112 of FIG. 3). In this case, the bookmarks 1 to 6 illustrated in FIGS. 10A to 10F are obtained. Moreover, by using the bookmark attribute relevance determination unit 114, the bookmark content acquisition unit 116 and the bookmark content relevance determination unit 118 in a combined manner, relevance between these bookmarks and the keywords is determined (Step S114 of FIG. 3, and FIG. 6). As a result, in this example, the bookmarks 1, 3, 5 and 6 are selected from the bookmarks 1 to 6 as bookmarks related to the keyword (related bookmarks). The related bookmark display unit 120 provides a list of the related bookmarks to the user by the display form shown in FIG. 11, for example (Step S116 of FIG. 3).

Here, a concrete procedure (flow of processing) about analysis processing of a browsing history in the case of the pattern 1 and determination processing of relevance will be described below.

First, analysis processing of a browsing history will be described. In the pattern 1 (FIG. 9A), based on the contents of the Web page which is being browsed, an important word is extracted as a keyword as mentioned above. Description will be added about this process.

The browsing history analysis unit 104 acquires histories, which represents a browsing process until the Web page being browsed at present has been reached, from browsing histories acquired at Step S102 (FIG. 3) as access information to the Web page which is being browsed (Step S202 of FIG. 4). Next, the browsing history analysis unit 104 verifies whether the Web page which is being browsed is a search site (Step S204 of FIG. 4). In this example, the Web page which is being browsed is not a search site. For this reason, the browsing history analysis unit 104 acquires the history of the Web page, which has been browsed just before the Web page which is being browsed at present, from the browsing histories (Step S206 of FIG. 4). In this case, access information to the "user's own blog" is obtained as shown in FIG. 9A. Because the Web page that has been browsed just before the current one is determined not to be a search site in accordance with this access information (at Step S208 of FIG. 4, NO), the browsing history analysis unit 104 determines the Web page which the user is browsing at present is not a page that has been reached via a search site.

Next, relevance determining processing will be described. First, from character strings included in the attribute AT of a bookmark, the bookmark attribute relevance determination unit 114 searches for the keywords "Windows" and "shortcut key" extracted as mentioned above in the pattern 1 (Step S302 of FIG. 6). In the pattern 1, as a bookmark which includes all the keywords in the attribute AT of the bookmark, the bookmarks 1 and 2 are chosen from the bookmarks 1 to 6. The bookmark 3, 4 5 and 6 are chosen from the bookmarks 1 to 6 as a bookmark in which a part or none of the keywords is not included.

About each of the bookmarks 1 and 2, by accessing the Web site 400 of the link destination via the network 300, the bookmark content acquisition unit 116 acquires the contents of the Web site concerned (Step S308 of FIG. 6). The bookmark 2 (FIG. 10B) from which a content has not able to be acquired at Step S308 is of a broken link. For this reason, the bookmark content relevance determination unit 118 determines that the Web site being browsed at present and the bookmark 2 has no relevance (Step S310 of FIG. 6).

On the other hand, about the bookmark 1 from which contents have been able to be acquired, the bookmark content relevance determination unit 118 searches for the keywords ("Windows" and "shortcut key") targeting the character strings included in the acquired contents (Step S309 of FIG. 6). Because the bookmark 1 includes the keywords, the bookmark content relevance determination unit 118 determines that the Web site being browsed at present and the bookmark 1 (FIG. 10A) have relevance (Step S312 of FIG. 6).

Also about each of the bookmark 3, 4, 5 and 6, by accessing the Web site 400 of the link destination via the network 300, the bookmark content acquisition unit 116 acquires the contents of the Web sites concerned (Step S304 of FIG. 6). Moreover, targeting the character strings of the acquired contents, the bookmark content relevance determination unit 118 searches for the keywords which have not been included in the attribute AT of the bookmark concerned (Step S306 of FIG. 6). As a result, the bookmark content relevance determination unit 118 determines that the bookmarks 3, 5 and 6 (FIGS. 10C, 10E and 10F) which include all of the keywords in their contents as ones having relevance (Step S312 of FIG. 6). On the other hand, the bookmark content relevance determination unit 118 judges that the bookmark 4 (FIG. 10D) that includes only a part of the keywords among the all keywords as one without relevance (Step S310 of FIG. 6).

A user tends to perform registration operation of usage classification about the URL of a certain Web site during the first-time browsing of the Web site. In the case of general technology, when it is assumed that an important word is used as usage classification, it can be thought that "OS; Comparison" and the like are set as usage classification. On the other hand, as the precondition in this example (the pattern 1), the Web page which a user is browsing at present is a Web page on which columns related to information technology is indicated as mentioned above. Because this Web page is a column site, contents which appear on it have a high possibility to be updated periodically, for example. Accordingly, in the case of the pattern 1, different from the contents at the time when this Web site has been browsed for the first time, it is featuring a shortcut key of Windows as illustrated in FIG. 9A. When association is performed based on information such as contents at the time when a certain Web site has been browsed for the first time, keywords "OS; Comparison", for example, are registered as usage classification as mentioned above in the case of general technology. For this reason, according to general technology, bookmarks related to the keywords "Windows" and "Shortcut key" which correspond to the present contents do not exist. In contrast, in this example, using information when a Web page has been browsed this time, the bookmark extracting system 100 associates the Web page and a registered bookmark. Consequently, according to this example, the related bookmark 1, 3, 5 and 6 can be extracted using keywords "Windows" and "Shortcut key" which correspond to the contents of the Web page being browsed at present. That is, it is possible to select the most suitable bookmarks related to the website being browsed at present accurately from bookmarks registered in advance, and provide them to a user.

Next, an example in the pattern 2 illustrated in FIG. 9B will be described. The pattern 2 is an example in which the "Web page which is being browsed" has been reached via a search site.

Also in the case of the pattern 2, a browsing history is analyzed just like the pattern 1 mentioned above to determine a move (transition) method to the Web page being browsed at present (Steps S102-S105 of FIG. 3). However, because the pattern 2 is of an example via a search site, the browsing history analysis unit 104 extracts, as keyword extraction processing, a search word (keyword which the user has inputted for a search in the search site) based on the browsing history (Step S110 of FIG. 3). At that time, in the pattern 2, "Microsoft", "Office" and "Shortcut key" are obtained as keywords.

Next, bookmark information is acquired from the bookmark memory unit 206 in common with the case of the pattern 1 (Step S112 of FIG. 3), and also in this case, the bookmarks 1 to 6 illustrated in FIGS. 10A to 10F are obtained. Moreover, by using the bookmark attribute relevance determination unit 114, the bookmark content acquisition unit 116 and the bookmark content relevance determination unit 118 in a combined manner, relevance between a bookmark and the keywords is determined (Step S114 of FIG. 3). As a result, as related bookmarks about the keywords, the bookmark 3, 4 and 6 (FIGS. 10C, 10D and 10F) are selected from the bookmarks 1 to 6. The related bookmark display unit 120 provides a list of the related bookmarks to the user by the display form shown in FIG. 11, for example (Step S116 of FIG. 3).

Here, about analysis processing of a browsing history and determination processing of relevance in the case of the pattern 2 (FIG. 9B), a concrete flow of processing which the bookmark extracting system 100 performs will be described below.

Processing of the browsing history analysis unit 104 (FIG. 4) will be described first. In the pattern 2 (FIG. 9B), search words in a search site are extracted as keywords as mentioned above. In the case of the pattern 2, in the analysis processing of a browsing history, after determining that the Web page which is being browsed at present is not a search site at Step S204, the browsing history analysis unit 104 acquires history information about a Web page which has been browsed just before the Web page being browsed from the browsing history (Step S206).

In the case of the example shown in FIG. 9B, in Step S206, access information about the "search result" screen of a search site is acquired. In the pattern 2, in Step S208, the access information acquired in Step S206 is identical with a search site stored in advance (here, it is assumed that it corresponds to search site ID 1 in the search site information shown in FIG. 7). Consequently, in Step S210, extraction of a search word is performed.

Such extraction of a search word is performed based on a "search word extracting method" included in the search site information shown in FIG. 7, for example. In this case, the browsing history analysis unit 104 acquires a URL corresponding to a "search result" from the history information and acquires a value q as a search word from the query character string of the URL. In the "search word extracting method" shown in FIG. 7, when a plurality of words are included as search words, they are connected by a symbol "+". This symbol "+" represents that, when it is a state that search words are connected, in other words, when there is a character string of "key 1+key 2", the character string is divided and "key 1" and "key 2" are obtained. That is, in Step S210, by dividing a character string using the value q, a search word group (a plurality of search words) which may be acquired is obtained. In the case of the example shown in FIG. 9B, "Microsoft", "Office" and "Shortcut key" are obtained as search words. The obtained search words are used as keywords during a content search of a bookmark (Step S306 and Step S309 of FIG. 6).

Thus, according to this example mentioned above, keywords which conform more to a matter that a user wants to know can be extracted. In contrast, in the case of general technology, when a Web site which is being browsed at present has been reached via a search site (the pattern 2 shown in FIG. 8B, for example), it is expected that words "Windows" and "shortcut key" which are important (have a high frequency of use) are extracted as a keyword from the contents of the Web site which is being browsed. For this reason, in the case of general technology, because bookmarks unrelated to a matter which a user wants to know may be extracted, it is not convenient.

Next, relevance determining processing will be described taking the pattern 2 shown in FIG. 9B as an example. First, targeting the character strings included in the attribute AT of a bookmark, the bookmark attribute relevance determination unit 114 searches for the keywords "Microsoft", "Office" and "Shortcut key" (Step S302 of FIG. 6). In this case, the bookmark 4 is selected as a bookmark which includes all the keywords in the attribute AT of the bookmark. The bookmark 1, 2, 3, 5 and 6 are selected as bookmarks in which a part of or all of the keywords are not included.

About the bookmark 4 (FIG. 10D), by accessing a specific Web site 400 that is the link destination via the network 300, the bookmark content acquisition unit 116 acquires the contents of the specific Web site (Step S308 of FIG. 6). When the contents have been able to be acquired, targeting the character strings in the contents, the bookmark content relevance determination unit 118 searches for the keywords (Step S309 of FIG. 6). In this case, because the bookmark 4 includes the keywords, the bookmark content relevance determination unit 118 determines that the bookmark 4 and the Web site which is being browsed have relevance (Step S312 of FIG. 6).

Also, about each of the bookmarks 1, 2, 3, 5 and 6, by accessing a specific Web site 400 that is the link destination via the network 300, the bookmark content acquisition unit 116 acquires the contents of the specific Web site (Step S304 of FIG. 6). Moreover, targeting the character strings in the acquired contents, the bookmark content relevance determination unit 118 searches for the keywords which have not been included in the attribute AT of the bookmark concerned (Step S306 of FIG. 6). In this case, because the bookmark 3 (FIG. 10C) includes all the keywords in the contents, the bookmark content relevance determination unit 118 determines that the bookmarks 3 and 6, and the Web site which is being browsed have relevance (Step S312 of FIG. 6). On the other hand, the bookmark 1, 2 and 5 (FIG. 10A, B, E) do not include a part of or all of the keywords in their contents. Accordingly, the bookmark content relevance determination unit 118 determines that the bookmark 1, 2, 5 and the Web site which is being browsed have no relevance (Step S310 of FIG. 6).

In analogy with the case of processing of the browsing history analysis unit 104 described before, according to general technology, it is expected that, in the case of the pattern 2, "Windows" and "Shortcut key" are extracted as keywords based on the Web site which is being browsed at present, and bookmarks 1, 3, 5 and 6 are extracted based on the keywords. In this case, an item which the user wants to know essentially in the Web site which is being browsed, that is, bookmarks having relation with "Microsoft", "Office" and "Shortcut key" will be omitted. In contrast, according to this example, as bookmarks which conform more to the matter which the user wants to know, the bookmarks 3 4 and 6 (FIGS. 10C, 10D and 10F) related to "Microsoft", "Office" and "Shortcut key" can be provided to the user.

Thus, in the second exemplary embodiment and its examples mentioned above, the bookmark extracting system 100 can select accurately the most suitable bookmarks related to the Web site which a user is browsing at present using the browser 200 from bookmarks registered in advance and provide them to the user.

Generally, even if sites have been found by a search and the like and registered as bookmarks before, it may not be possible to find a desired bookmark any more as a result of a great deal of bookmarks having been registered. Alternatively, by having forgotten the fact itself that a certain bookmark has been registered, the user may not be able to utilize it any more. For such situation, according to the second exemplary embodiment and the examples mentioned above, bookmarks related to a Web page can be provided to a user when the Web page is browsed, in both cases of the pattern 1 and the patterns 2 above. Therefore, the user can reach a Web page on which a matter wanted to know is described faster. The reason of this is that, by functions of such as the bookmark attribute relevance determination unit 114 and the bookmark content relevance determination unit 118, a bookmark related to a Web page which the user is browsing at present can be extracted accurately.

According to the second exemplary embodiment and the examples above, bookmarks which reflect intention of a user who has referred to a Web site being browsed now can be extracted more correctly. When stated specifically, in the case of the pattern 2 (FIG. 8B), when the contents of a Web site which is being browsed now are analyzed by the frequency of use or the like, "Windows" and "Shortcut key" seem to be obtained as keywords according to general technology. However, in the case of the pattern 2, the user has arrived at the Web site which is being browsed currently as a result of performing a search for "Office Shortcut key". Accordingly, in this case, it can be thought that the user desires information related to the search words inputted to the search site. According to the second exemplary embodiment and the example (FIG. 9B) mentioned above, because extraction of a bookmark can be performed using the search words, bookmarks which conform more to hope of a user can be extracted. In addition, when a user has forgotten a bookmark registered before and performs a search for the same purpose in a search site again, the bookmark registered before can be provided to the user. The reason is that a browsing history is analyzed by the browsing history analysis unit 104 to know by what kind of method the user has referred to the Web site which is being browsed.

Also according to the second exemplary embodiment and the examples mentioned above, bookmarks related to the contents of a Web page at the time when the user has accessed the Web page which is being browsed can be extracted. As a result, corresponding to a change in contents since the last time the user has accessed the Web page, bookmarks that conform more to the current state can be extracted. The reason of this is that, about a Web page which is linked with a registered bookmark, relevance is verified as a result of analyzing the contents at the time of current browsing of the Web page being browsed at present by the browsed content analysis unit 110.

Also, according to the second exemplary embodiment and the examples mentioned above, a bookmark can be extracted in conformity with the contents of the bookmark at the time of accessing the Web page which is being browsed. As a result, extraction of a related bookmark which cannot be found by information included in the attribute AT of the bookmark can be made, or exclusion of a bookmark of a broken link from related bookmarks can be made. The reason of this is that, in relevance determining processing, relevance between a keyword and not only attribute information, but also contents of the link destination of a bookmark can be determined in a combined manner by the bookmark content relevance determination unit 118.

The Third Exemplary Embodiment

Next, the third exemplary embodiment based on the first and second exemplary embodiments mentioned above will be described. In the following description, characteristic portions of this embodiment will be mainly described. On this occasion, by attaching an identical reference number to a same structure as an exemplary embodiment mentioned above, the overlapped description will be omitted.

Figure 12:
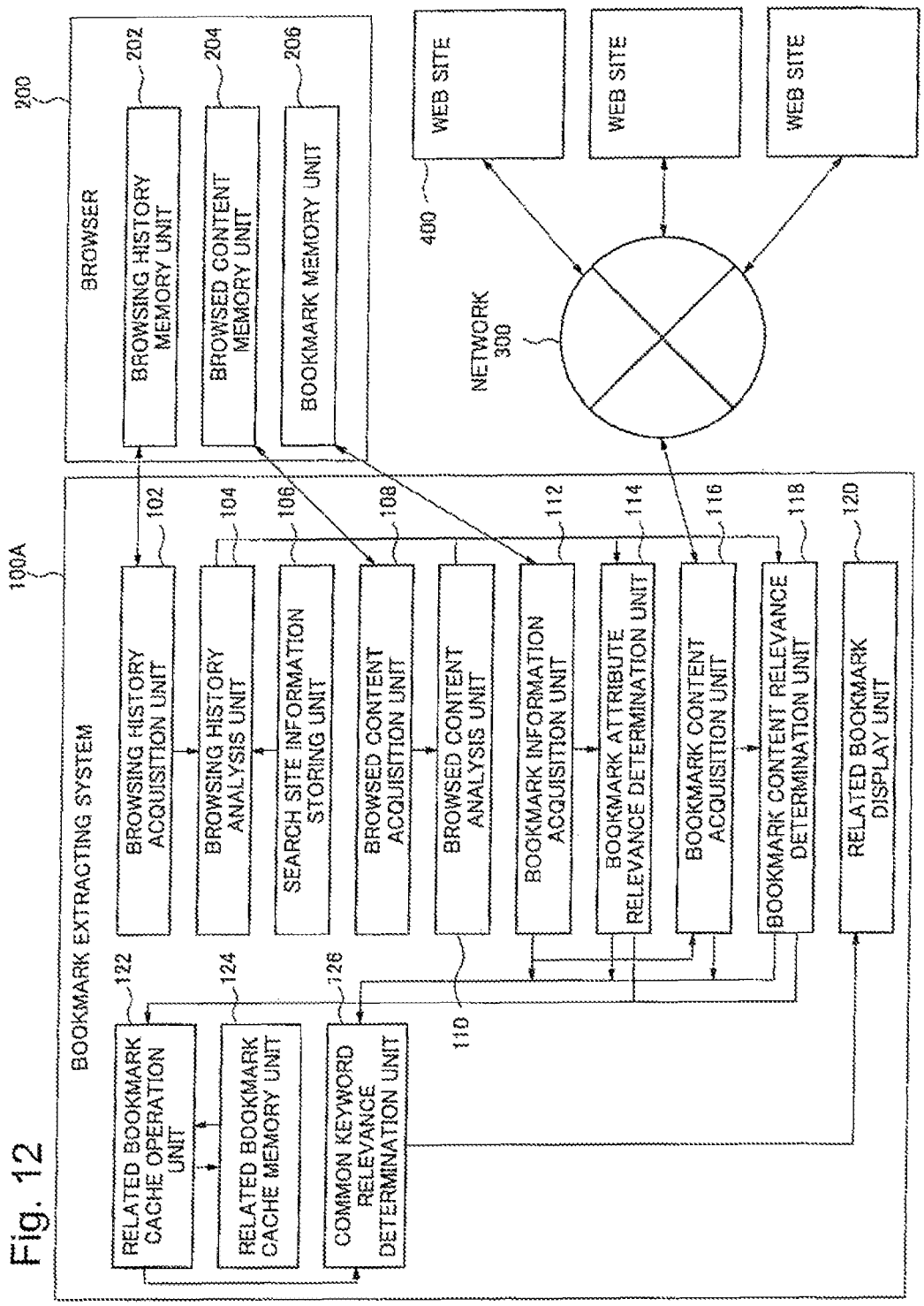
FIG. 12 is a block diagram exemplifying a communication environment including a bookmark extracting system according to a third exemplary embodiment of the present invention.

FIG. 12 is a block diagram exemplifying a communication environment including a bookmark extracting system according to the third exemplary embodiment of the present invention. When classified roughly, a communication environment shown in FIG. 12 includes the bookmark extracting system 100A, the browser 200, the network 300 and the Web site 400. In addition to the structure of the bookmark extracting system 100 according to the second exemplary embodiment shown in FIG. 2, the bookmark extracting system 100A further includes a related bookmark cache operation unit 122, a related bookmark cache memory unit 124 and a common keyword relevance determination unit 126. The bookmark extracting system 100A corresponds to the bookmark extracting apparatus 1 in the first exemplary embodiment mentioned above.

In this exemplary embodiment, the related bookmark cache memory unit 124 and the related bookmark cache operation unit 122 are provided in order to reduce a load when extracting a related bookmark mainly. That is, in this exemplary embodiment, the related bookmark cache memory unit 124 and the related bookmark cache operation unit 122 realize a cache function for various data.

About Web pages which the user has browsed up to now using the browser 200 (that is, including a Web page which is being browsed), the related bookmark cache memory unit 124 holds a data cache (cache). This cache is corresponding information in which: a plurality of items of data described below are included, for example; and these are associated with each other.

The URLs of Web pages which the user has browsed up to now using the browser 200 (that is, including the Web page which is being browsed);

Keywords extracted from the Web pages;

Identification information (ID) of related bookmarks about the Web pages; and

The last access time to each of the Web pages.

Here, the extracted keywords are keywords which have been extracted by the first or second search process in the second exemplary embodiment mentioned above. A related bookmark is a bookmark which has been determined by the bookmark attribute relevance determination unit 114 and the bookmark content relevance determination unit 118 in the second exemplary embodiment that it has relevance.

It is assumed that the lifetime of information held by the cache function lasts until time when the operation of the browser 200 is completed (until use of the browser function ends) or when the system is powered off, for example. The reason of this is to correspond to a change in contents of a Web page and a bookmark. The common keyword relevance determination unit 126 determines relevance of an extracted common keyword.

(Description of Operations)

Next, operations of this exemplary embodiment having the aforementioned constitution will be described in detail.

Figure 13:
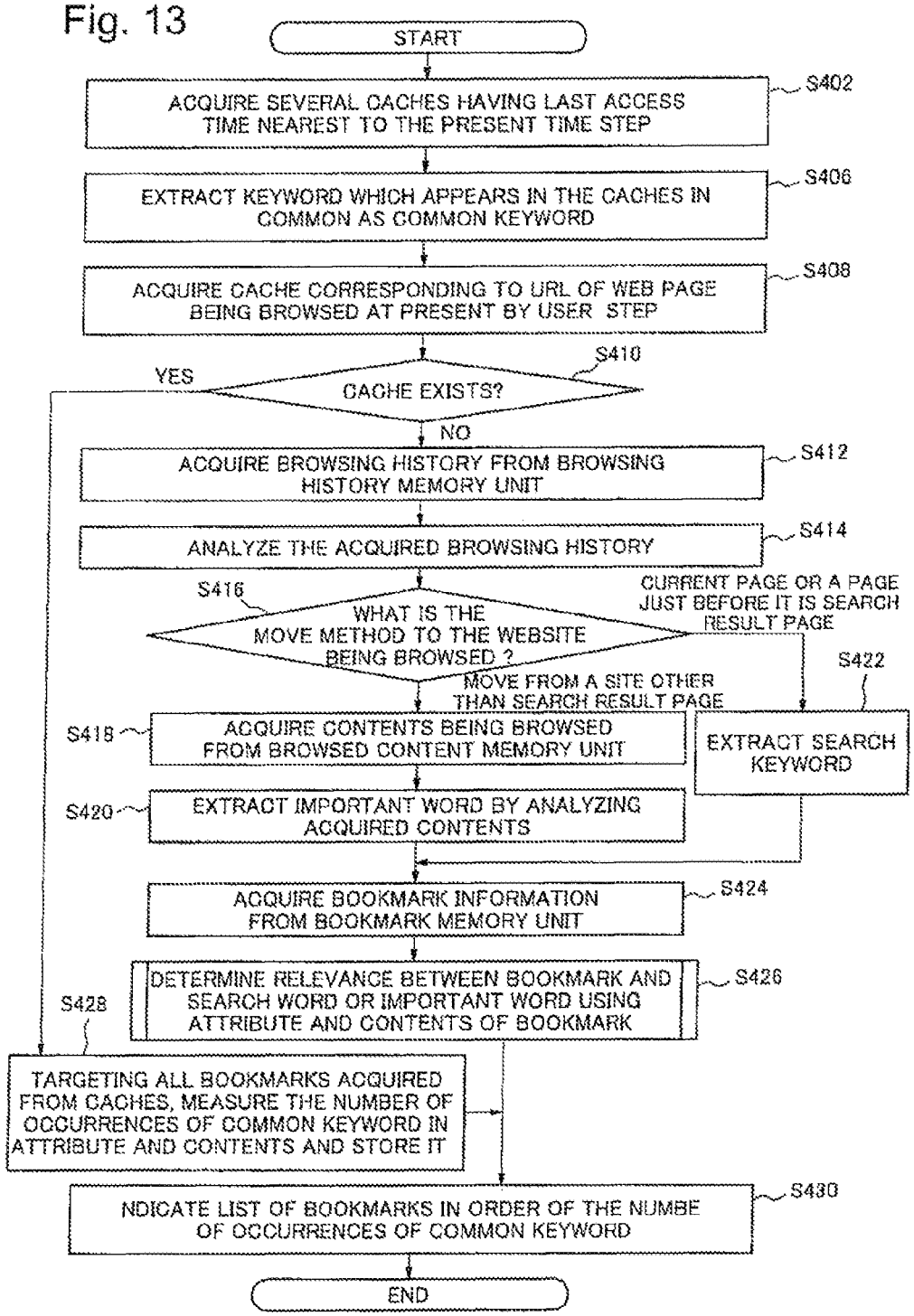
FIG. 13 is a flow chart illustrating a bookmark extraction processing by a bookmark extracting system 100A according to the third exemplary embodiment of the present invention.

FIG. 13 is a flow chart showing bookmark extraction processing by the bookmark extracting system 100A according to the third exemplary embodiment of the present invention. The bookmark extracting system 100A begins to operate in response to a user accessing a desired Web page using the browser 200 as is the case with the second exemplary embodiment.

First, by referring to the related bookmark cache memory unit 124, the related bookmark cache operation unit 122 acquires several caches having last access time (date and time) nearest to the present time (Step S402). Next, targeting the caches acquired at Step S402, the common keyword relevance determination unit 126 extracts a keyword which appears in the caches in common as a common keyword related to the caches (Step S406). By referring to the related bookmark cache memory unit 124, the related bookmark cache operation unit 122 acquires a cache corresponding to the URL of the Web page which the user is browsing at present (Step S408).

As a result of trying to acquire the cache in Step S408, the related bookmark cache operation unit 122 determines whether the cache corresponding to the Web page which is being browsed exists or not (Step S410). Here, a case where the cache exists is a case where there is a URL which is the same as the URL of the Web page being browsed at present in the URLs of the Web pages which have been browsed in the past stored in the related bookmark cache memory unit 124. The related bookmark cache operation unit 122 searches and detects such URL in the Step 410.

When it is determined that a cache exists (at Step S410, YES), by using identification information of all related bookmarks acquired from the related bookmark cache memory unit 124 as a key, the common keyword relevance determination unit 126 acquires attribute information (AT) about all the related bookmarks from the bookmark information acquisition unit 112. The common keyword relevance determination unit 126 acquires, via the bookmark contents acquisition unit 116, the contents of Web pages which are the link destinations of the related bookmarks from the Web pages. Then, targeting the acquired attribute AT and contents of the related bookmarks, the common keyword relevance determination unit 126 measures the number of occurrences of the common keyword, holds the measured numerical values (Step S428) and advances processing to Step S430. Here, all bookmarks acquired from the related bookmark cache memory unit 124 at Step S428 represent all the related bookmarks acquired in association with the several Web pages (URLs) near the present time.

On the other hand, when it is determined that a cache does not exist (at Step S410, NO), processing approximately the same as the processing of steps from Step S102 to S114 (FIG. 3) mentioned above in the second exemplary embodiment is performed in Step S412 to Step S426. However, the processing in Step S426 is different from that of Step S114 in part as mentioned later with reference to FIG. 14.

Then, the related bookmark display unit 120 indicates the bookmarks which have been determined to have relevance in Step S426 or all bookmarks which have been made be measurement objects in Step S428 as a list in order of the number of occurrences of the common keyword (Step S430). For example, when it is described taking the case of the display form shown in FIGS. 10A to 10F as an example, the bookmark 1, 3 and 5 are indicated in the order of the number of occurrences in a bookmark from highest to lowest.

Figure 14:
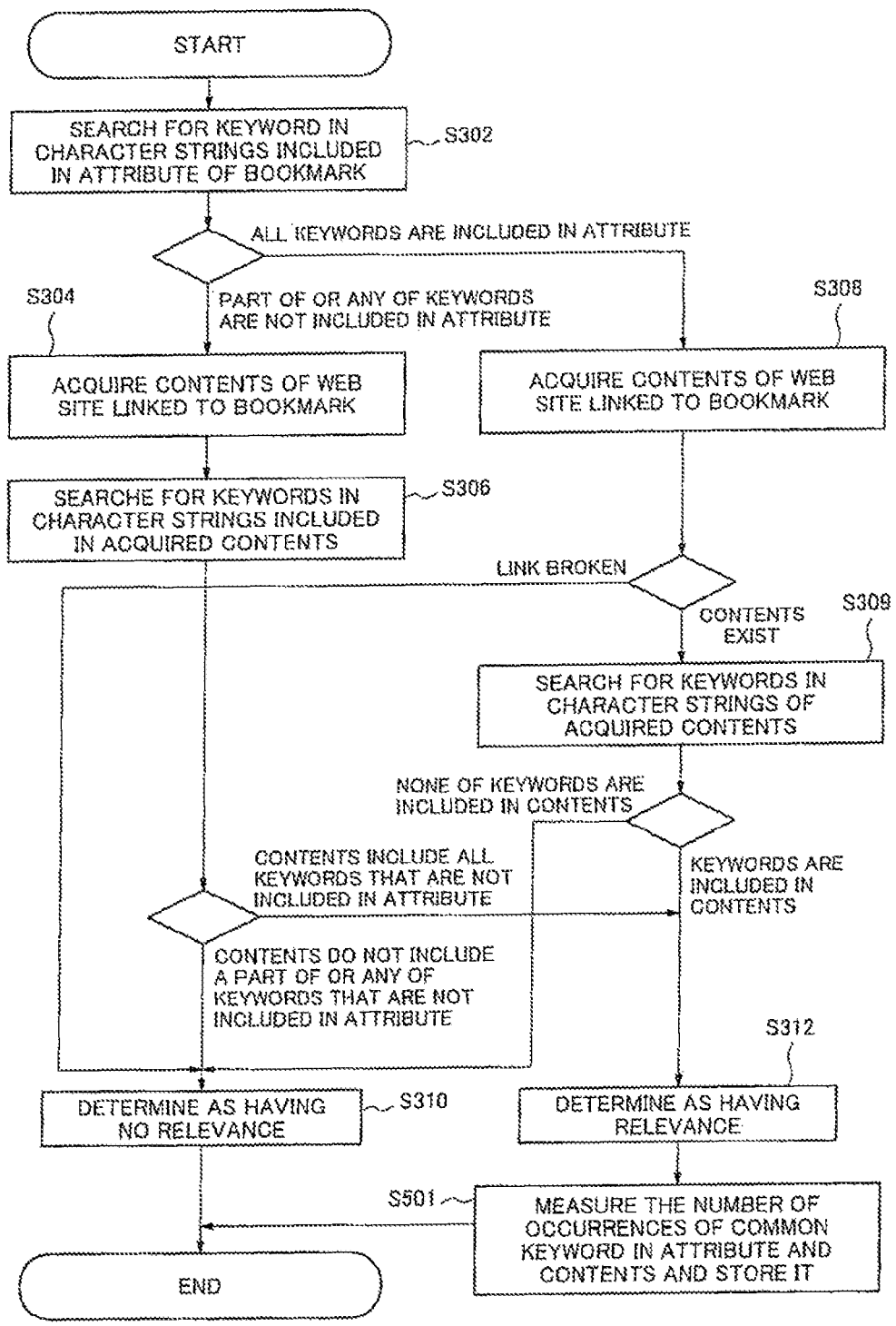
FIG. 14 is a flow chart illustrating relevance determining processing in the third exemplary embodiment of the present invention.

Here, relevance determining processing performed at Step S426 will be described with reference to FIG. 14. FIG. 14 is a flow chart showing relevance determining processing in the third exemplary embodiment of the present invention, and indicates details of Step S426 shown in FIG. 13 mentioned above. In addition to the same processing configuration as relevance determining processing mentioned above in the second exemplary embodiment (FIG. 6), this flow chart further includes Step S501 after Step S312. That is, in Step S501, targeting all bookmarks that have been determined to have relevance in Step S312, the common keyword relevance determination unit 126 measures the number of occurrences of the common keyword in the attribute AT and the contents of a bookmark, and holds the measured numerical values and processing is advanced to Step S430.

According to the third exemplary embodiment above, it is possible to select most suitable bookmarks related to a Web site which is being browsed at present accurately from bookmarks registered in advance, and provide these to a user as is the case with the second exemplary embodiment mentioned above. Moreover, according to this exemplary embodiment, using the cache function performed by the related bookmark cache operation unit 122 and the related bookmark cache memory unit 124, corresponding information mentioned above can be cached. As a result, a load when analyzing a browsing history, browsing contents and bookmark contents can be reduced.

Also according to the third exemplary embodiment above, by this cache function, it is possible to correspond to operations such as "Advance" and "Return" by browser navigation.

The Fourth Exemplary Embodiment

Next, the fourth exemplary embodiment based on the first and second exemplary embodiments mentioned above will be described. In the following description, characteristic portions of this embodiment will be mainly described. In that case, by attaching identical reference numbers to the same structures as the exemplary embodiments mentioned above, overlapped description will be omitted.

In this exemplary embodiment, another display form is provided to the user as described below. That is, the another display form in this embodiment, when bookmarks related to a Web site which a user is browsing at present are provided to the user, registered bookmarks are provided in a display form in which they are ranked according to a degree of relevance with the Web site.

In the following description, as an example, it is assumed that ranks of relevance are six ranks from rank 1 (relevance: high) to rank 6 (relevance: low) as follows. That is:

Rank 1: The case where all keywords are included in both the bookmark attribute AT and the contents;
Rank 2: The case where the bookmark attribute AT includes a part of the keywords, and the contents include all the keywords;
Rank 3: The case where any of the keywords is not included in the bookmark attribute AT, and the contents include all the keywords;
Rank 4: The case where the bookmark attribute AT includes all the keywords, and the contents include a part of the keywords;
Rank 5: The case where the bookmark attribute AT includes a part of the keywords, and the contents include all the remaining keywords; and
Rank 6: The case where the bookmark attribute AT includes all the keywords, and the contents includes none of the keywords.

System configuration and total processing configuration in this exemplary embodiment is almost the same as the second exemplary embodiment mentioned above. However, as described below, it is different in the configuration of relevance determining processing realized by a combination of the bookmark attribute relevance determination unit 114, the bookmark content acquisition unit 116 and the bookmark content relevance determination unit 118.

Figure 15:
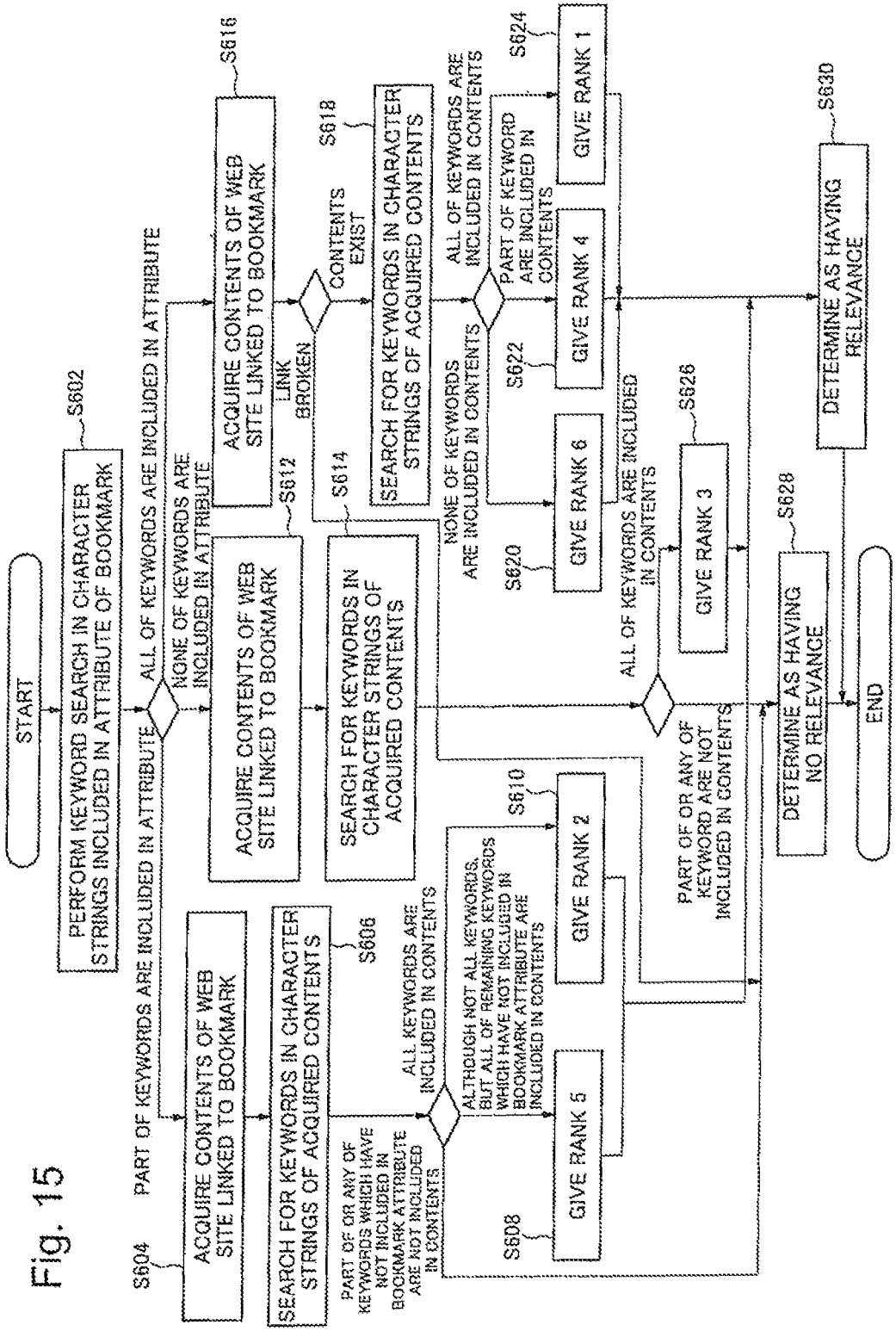
FIG. 15 is a flow chart illustrating relevance determining processing in a fourth exemplary embodiment of the present invention.

FIG. 15 is a flow chart showing relevance determining processing in the fourth exemplary embodiment of the present invention, and indicates details of Step S114 shown in FIG. 3 mentioned above.

First, similarly with Step S302 in the second exemplary embodiment (FIG. 6), by referring to bookmark information acquired by the bookmark information acquisition unit 112 at Step S112 (FIG. 3), the bookmark attribute relevance determination unit 114 performs a keyword search targeting the character strings included in the attribute AT of a bookmark (Step S602).

According to the result of determination in Step S602, the bookmark content acquisition unit 116 branches to processing of any one of Step S604, Step S612 and Step S616. That is, when a part of the keywords is included in the attribute AT of a bookmark, Step S604 is carried out. Step S612 is carried out when none of the keywords are not included in the bookmark attribute AT. Step S616 is carried out when all the keywords are included in the bookmark attribute AT.

In Step S604, Step S612 and Step S616, the bookmark content acquisition unit 116, just like Step S304 and Step S308 in the second exemplary embodiment (FIG. 6), accesses a specific Web site 400 that is the link destination of the bookmark concerned. As a result, the bookmark content acquisition unit 116 acquires the contents of the specific Web site 400 via the network 300.

When contents have not been able to be obtained although tried in Step S616, it can be determined that the specific Web site 400 is of a broken link. For this reason, the bookmark content relevance determination unit 118 determines that a bookmark corresponding to the Web site has no relevance with the Web site being browsed at present (Step S628). On this occasion, the bookmark content relevance determination unit 118 may report that a broken link has occurred to the user by indication and the like.

On the other hand, when contents can be obtained according to the processing in Step S616, just like Step S309 in the second exemplary embodiment (FIG. 6), in view of a change in contents from time when the bookmark has registered by the user, the bookmark content acquisition unit 116 searches for the keywords in the character strings of the acquired contents (Step S618).

Then, according to the search result of Step S618, the bookmark content relevance determination unit 118 branches to Step S620, Step S622 or Step S624. That is, when none of the keywords are included in the contents acquired at Step S616, the bookmark content relevance determination unit 118 gives rank 6 (Step S620). When a part of the keywords are included in the contents acquired at Step S616, the bookmark content relevance determination unit 118 gives rank 4 (Step S622). When all the keywords are included in the contents acquired at Step S616, the bookmark content relevance determination unit 118 gives rank 1 (Step S624). Moreover, in the cases of these three, the bookmark content relevance determination unit 118 determines that, as is the case with Step S312 in the second exemplary embodiment (FIG. 6), the specific Web site 400 that is the link destination has relevance with the Web site being browsed at present (Step S630).

After acquiring contents at Step S604 and Step S612, just like Step S306 in the second exemplary embodiment (FIG. 6), the bookmark content relevance determination unit 118 searches for the keywords which have not included in the attribute AT of a bookmark in the character strings which are included in the acquired contents (Step S306 and Step S614).

As a result of the search in Step S614, when the acquired contents include all the keywords, the bookmark content relevance determination unit 118 gives rank 3 (Step S626). In this case, the bookmark content relevance determination unit 118 determines that the specific Web site 400 that is the link destination has relevance with the Web site being browsed at present (Step S630). In contrast, when the acquired contents do not include any of the keywords, or when the acquired contents only include a part of the keywords, the bookmark content relevance determination unit 118 determines that the specific Web site 400 that is the link destination has no relevance with the Web site being browsed at present (Step S628).

Further, as a result of the search in Step S606, when only a part of the keywords which have not included in the bookmark attribute AT are included in the contents acquired at Step S604, or when none of the keywords are included, the bookmark content relevance determination unit 118 determines that the specific Web site 400 that is the link destination has no relevance with the Web site being browsed at present (Step S628).

In contrast, as a result of the search in Step S606, when all the remaining keywords which have not been included in the bookmark attribute AT are included in the contents acquired at Step S604, the bookmark content relevance determination unit 118 gives rank 5 (Step S608). When all the keywords are included in the contents acquired at Step S604, rank 2 is given by the bookmark content relevance determination unit 118 (Step S610). In these cases, the bookmark content relevance determination unit 118 determines that the specific Web site 400 that is the link destination has relevance with the Web site being browsed at present (Step S630).

FIG. 16 is a diagram exemplifying a display form of a list screen of related bookmarks in the fourth exemplary embodiment of the present invention. The example shown in FIG. 16 indicates a state that, in the left side frame of a Web page being indicated at present, a list of bookmarks related to the Web page are indicated by a function of the browser 200. In this case, as related bookmarks, the bookmarks 1, 5, 3 are indicated in order from rank 1 to rank 3. Further, in this example, as a bookmark with a possibility that the bookmark has been changed from the contents when registered, the bookmark 3 is indicated. Also in this example, as a bookmark with a possibility of a broken link, the bookmark 2 is indicated.

According to the fourth exemplary embodiment mentioned above, as is the case with the first and second exemplary embodiments, it is possible to select the most suitable bookmarks related to a website browsed at present accurately from bookmarks registered in advance and provide them to a user. Further, according to this exemplary embodiment, because ranking is performed in relevance determining processing, it is possible to select bookmarks with relevance that conforms more to a Web page being browsed accurately according to a degree of relevance, and provide them to a user in an easily distinguished manner.

Also according to the fourth exemplary embodiment mentioned above, it is possible to report occurrence of a broken link and a change in contents from time when a bookmark has been registered to a user in an easily distinguished manner.

Example Common to the First to Fourth Exemplary Embodiments

Next, an example common to the first to fourth exemplary embodiments mentioned above will be described with reference to FIG. 17. A case where the bookmark extracting system 100, 100A and the browser 200 according to the first to fourth exemplary embodiments mentioned above are realized using a computer (information processing apparatus) will be described. That is, although an apparatus according to the first to fourth exemplary embodiments may be realized by dedicated hardware, it may be also realized by executing a computer program (software) in a computer as a hardware resource as is the case for this example.

Figure 17:
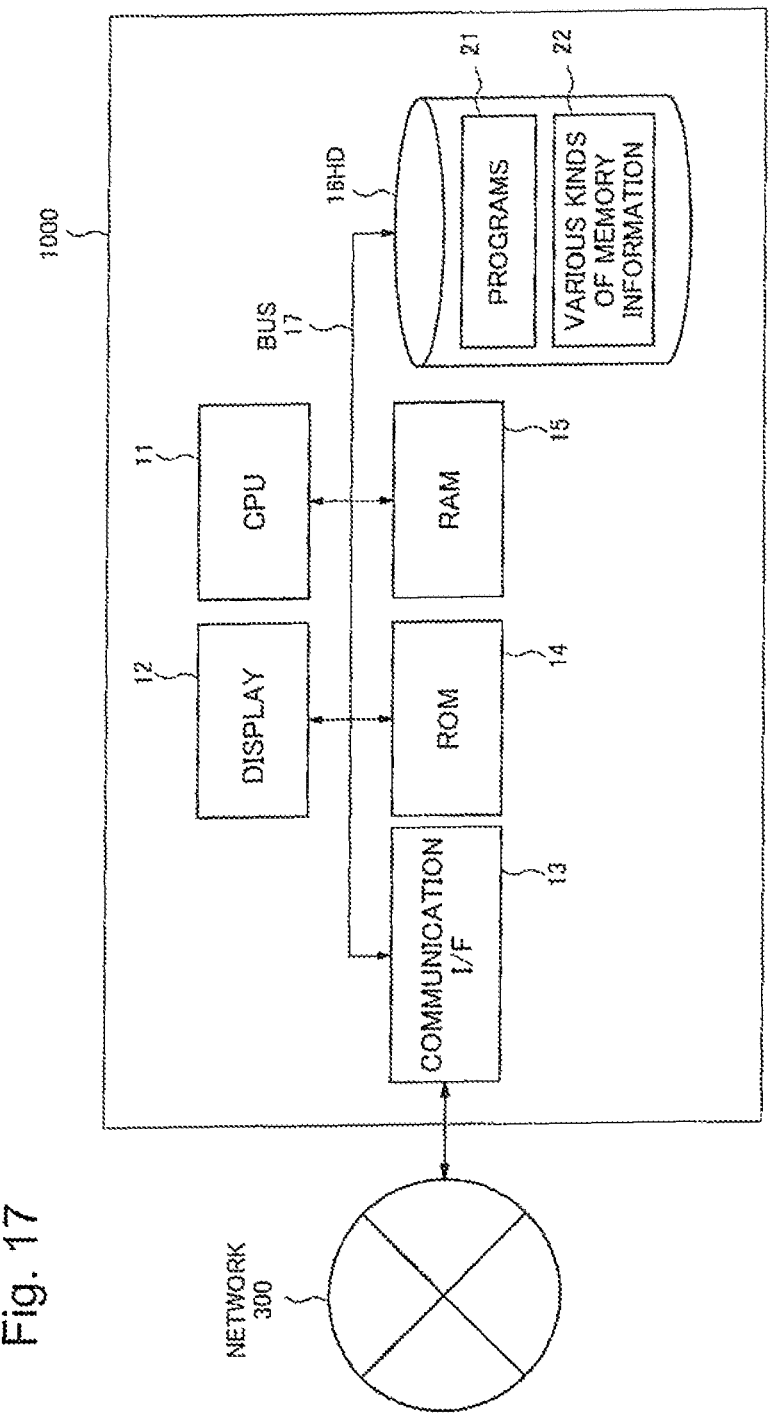
FIG. 17 is a diagram exemplarily describing a hardware configuration of a computer (information processing apparatus) which can realize the first to fourth exemplary embodiments of the present invention.

FIG. 17 is a diagram which exemplarily describes a hardware configuration of a computer (information processing apparatus) which can realize the first to fourth exemplary embodiments of the present invention. The hardware of the computer 1000 shown in FIG. 17 includes: CPU 11 (Central Processing Unit), the display 12 and a communication interface (I/F) 13, a ROM (Read Only Memory) 14, a RAM (Random Access Memory) 15 and a hard disk drive (HD) 16, and has a structure in which these are connected via a bus 17. In each of the exemplary embodiments mentioned above, the communication interface 13 is general communication means which realizes communication with the Web site 400 shown in FIG. 2 and FIG. 12 via the network 300. In such hardware configuration, the CPU 11 controls the general operations of the computer 1000 as at least the bookmark extracting system 100 (100A).

The present invention that has been described taking the first to fourth exemplary embodiments mentioned above as examples is achieved by, after supplying a computer program which can realize the functions of the flow charts (FIGS. 3 to 6 and FIGS. 13 to 15) referred to in the description to the computer 1000 shown in FIG. 17, reading the computer program into the CPU 11 of the computer 1000 and executing it. A computer program supplied into the computer 1000 may be stored in a storage device (storage medium) such as a temporary storage memory (15) or a hard disk device (16) capable of being read and written.

Here, in the case of each of the exemplary embodiments mentioned above, computer programs related to each of the above-mentioned flow charts represent respective functions of the browsing history acquisition unit 102, the browsing history analysis unit 104, the browsed content acquisition unit 108, the browsed content analysis unit 110, the bookmark information acquisition unit 112, the bookmark attribute relevance determination unit 114, the bookmark content acquisition unit 116, the bookmark content relevance determination unit 118, the related bookmark display unit 120, the related bookmark cache operation unit 122 and the common keyword relevance determination unit 126. Such computer programs correspond to programs 21 stored in the hard disk drive (HD) 16, for example.

The browsing history memory unit 202, the browsed content memory unit 204 and the bookmark memory unit 206 in the browser 200 may be stored in the hard disk drive 16 as various kinds of memory information 22, for example. Also, the search site information storing unit 106 and the related bookmark cache memory unit 124 in the bookmark extracting systems 100, 100A may be stored in the hard disk drive 16 as the various kinds of memory information 22, for example. The memory information 22 is updated according to execution of the programs 21.

In the case of the above, as a method of supplying a computer program into a computer, a procedure which is general nowadays such as a method to install it in the computer via a various recording media such as CD-ROM and a method to download it from outside via a communication line such as the Internet can be adopted. In such cases, it can be recognized that the present invention is configured by the codes of the computer programs (the programs 21) or by a storage medium in which the codes are stored.

As described above, according to each of the exemplary embodiments and its examples mentioned above, it is possible to select the most suitable bookmarks related to a website being browsed at present accurately from bookmarks registered in advance and provide them to a user.

Meanwhile, the exemplary embodiments mentioned above and part or all of their modifications can also be described as the following additions. However, the present invention described exemplarily by the exemplary embodiments and the modifications mentioned above is not limited to the followings.

(Addition 1) A bookmark extracting apparatus including:
a keyword extraction unit to extract a keyword based on browsing history information of websites up to now;
a providing unit to provide, from a plurality of registered bookmarks, a bookmark related to the keyword extracted by the keyword extraction unit based on the keyword.

(Addition 2) The bookmark extracting apparatus according to the addition 1, wherein
based on information about a website being currently browsed included in the browsing history information, the keyword extraction unit acquires contents of the currently-browsed website and extracts the keyword from the contents.

(Addition 3) The bookmark extracting apparatus according to the addition 2, wherein the keyword extraction unit includes an important keyword extraction unit to extract an important keyword included in the contents acquired from the currently-browsed website as the keyword, and wherein
the providing unit provides a bookmark related to the important keyword from the plurality of bookmarks based on the important keyword.

(Addition 4) The bookmark extracting apparatus according to the addition 3, wherein
the important keyword extraction unit determines the important keyword according to a frequency of occurrence in the contents.

(Addition 5) The bookmark extracting apparatus according to the addition 1, wherein,
when, by analyzing the browsing history information, a currently-browsed website is determined to have made transition from a search site, the keyword extraction unit extracts a search keyword having been used before the transition to the currently-browsed website as the keyword; and wherein
the providing unit provides, from the plurality of bookmarks, a bookmark related to the search keyword based on the search keyword.

(Addition 6) The bookmark extracting apparatus according to the addition 5, wherein,
when a website having been browsed just before the transition to the currently-browsed website is a search site, the keyword extraction unit extracts as the keyword a search keyword having been used in the search site.

(Addition 7) The bookmark extracting apparatus according to any one of the additions 1 to 6, wherein
the providing unit includes a relevance determination unit to determine presence of relevance between the keyword and each bookmark included in information about the plurality of bookmarks according to a degree of inclusion of the keyword in the attribute information of the each bookmark.

(Addition 8) The bookmark extracting apparatus according to any one of the additions 1 to 6, wherein
the providing unit includes a relevance determination unit for determining presence of relevance between the keyword and each bookmark included in information about the plurality of bookmarks according to a degree of inclusion of the keyword in the contents of a website linked with the bookmark concerned.

(Addition 9) The bookmark extracting apparatus according to any one of the additions 1 to 6, wherein
the providing unit includes a relevance determination unit to determine presence of relevance between the keyword and each bookmark included in information about the plurality of bookmarks according to a combination of a degree of inclusion of the keyword in the attribute information of the each bookmark and a degree of inclusion of the keyword in the contents of a website linked with the bookmark concerned.

(Addition 10) The bookmark extracting apparatus according to any one of the additions 7 to 9, wherein
the providing unit provides a plurality of bookmarks having been determined as having relevance by the relevance determination unit in a manner being ranked.

(Addition 11) The bookmark extracting apparatus according to the addition 7, wherein,
based on a result of determination by the relevance determination unit, the providing unit provides a user with information on a possibility of a change in contents of a website corresponding to the bookmark from time of registration of the bookmark or information on a break of a link to the website.

(Addition 12) A bookmark extracting method comprising:
extracting a keyword based on browsing history information of a website up to now; and
providing a bookmark related to the extracted keyword from a plurality of bookmarks registered in advance based on the keyword.

(Addition 13) The bookmark extracting method according to the addition 12, wherein,
when extracting the keyword, contents of a currently-browsed website are acquired based on information about the currently-browsed website included in the browsing history information, the keyword being extracted from the contents.

(Addition 14) A bookmark extracting method according to the addition 11, wherein,
when extracting the keyword, when a currently-browsed website is determined to have made transition from a search site as a result of analyzing the browsing history information, a search keyword having been used before the transition to the currently-browsed website is extracted as the keyword; and wherein
a bookmark related to the search keyword among the plurality of bookmarks is provided based on the search keyword.

(Addition 15) A bookmark extracting method according to the addition 14, wherein,
when extracting the keyword, in a case that a website having been browsed just before the transition to the currently-browsed website is a search site, a search keyword having been used in the search site is extracted as the keyword.

(Addition 16) A computer program for controlling an operation of a bookmark extracting apparatus, the computer program causing a computer to realize:
a keyword extraction function to extract a keyword based on browsing history information of a website up to now; and
a providing function to provide a bookmark related to the keyword extracted by the keyword extraction function from a plurality of registered bookmarks based on the keyword.

(Addition 17) The computer program according to the addition 16, wherein,
based on information about a currently-browsed website included in the browsing history information, the keyword extraction function acquires contents of the currently-browsed website and extracts the keyword from the contents.

(Addition 18) The computer program according to the addition 16, wherein,
as a result of analyzing the browsing history information, when a currently-browsed website is determined to have made transition from a search site, the keyword extraction function extracts a search keyword having been used before the transition to the currently-browsed website as the keyword; and wherein
the providing function provides a bookmark related to the search keyword from the plurality of bookmarks based on the search keyword.

(Addition 19) The computer program according to the addition 18, wherein, when a website browsed just before the transition to the currently-browsed website is a search site, the keyword extraction function extracts a search keyword having been used in the search site as the keyword.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A bookmark extracting apparatus comprising:
    a control unit comprising at least one central processing unit (CPU);
    a keyword extraction unit, executed by the at least one CPU, which extracts a keyword based on analysis of browsing history information of a currently-browsed website; and
    a providing unit, executed by the at least one CPU, which provides, from a plurality of previously registered bookmarks, a bookmark related to the keyword extracted by the keyword extraction unit;
    wherein:
        when the currently-browsed website is determined to have made an immediate transition from a search site, the keyword extraction unit extracts a search keyword having been used in the search site before the transition to the currently-browsed website and used the extracted search keyword as the keyword;
        when, the currently-browsed website is determined to have made the immediate transition from a non-search site, the keyword extraction unit extracts at least one content keyword from contents acquired in the currently browsed website and used the extracted at least one content keyword as the keyword;
        the search site comprises at least one search engine; and
        the CPU, the keyword extraction unit, and the providing unit are client-based.

2. The bookmark extracting apparatus according to claim 1, wherein the keyword extraction unit includes an important keyword extraction unit to extract an important keyword included in the contents acquired from the currently-browsed website as the keyword, and wherein
    the providing unit provides the bookmark related to the important keyword from the plurality of bookmarks based on the important keyword.

3. The bookmark extracting apparatus according to claim 2, wherein the important keyword extraction unit determines the important keyword according to a frequency of occurrence in the acquired contents.

4. The bookmark extracting apparatus according to claim 1, wherein the providing unit includes a relevance determination unit to determine presence of relevance between the keyword and each bookmark included in information about the plurality of previously registered bookmarks according to a degree of inclusion of the keyword in attribute information of the each bookmark.

5. The bookmark extracting apparatus according to claim 4, wherein the providing unit provides the each bookmark having been ranked by the relevance as determined by the relevance determination unit.

6. The bookmark extracting apparatus according to claim 4, wherein, based on a result of determination by the relevance determination unit, the providing unit provides a user with information on a possibility of a change in contents of a website corresponding to the bookmark from time of registration of the bookmark or information on a break of a link to the website.

7. The bookmark extracting apparatus according to claim 1, wherein the providing unit includes a relevance determination unit to determine presence of relevance between the keyword and the each bookmark according to a degree of inclusion of the keyword in contents of a website linked with a particular bookmark.

8. The bookmark extracting apparatus according to claim 1, wherein the providing unit includes a relevance determination unit to determine presence of relevance between the keyword and each bookmark included in information about the plurality of previously registered bookmarks according to a combination of a degree of inclusion of the keyword in attribute information of the each bookmark and a degree of inclusion of the keyword in contents of a website linked with a particular bookmark.

9. A bookmark extracting method, comprising:
    analyzing browsing history information;
    extracting a keyword based on the browsing history information of a currently-browsed website; and
    providing a bookmark related to the extracted keyword from a plurality of previously registered bookmarks based on the keyword;
    wherein, as the browsing history information is being analyzed:
        when the currently-browsed website is determined to have made an immediate transition from a search site, a search keyword having been used in the search site before the transition to the currently-browsed website is extracted and used as the keyword;
        when, the currently-browsed website is determined to have made the immediate transition from a non-search site, at least one content keyword from contents acquired in the currently-browsed website is extracted and used as the keyword;
        the search site comprises at least one search engine; and
        the analyzing, the extracting, and the providing are implemented at a client.

10. The bookmark extracting method according to claim 9, wherein, when extracting the keyword, in a case that the currently-browsed website is determined to have made the transition from the search site as a result of the analyzing the browsing history information, the search keyword having been used before the transition to the currently-browsed website is extracted as the keyword.

11. A non-transitory computer-readable recording medium having recorded there on a program for controlling an operation of a bookmark extracting apparatus, wherein said program, which when executed by a computer of the apparatus causes the computer to implement:
    a keyword extraction function to extract a keyword based on analysis of browsing history information of a currently-browsed website; and
    a providing function to provide a bookmark related to the keyword extracted by the keyword extraction function from a plurality of previously registered bookmarks based on the keyword;

wherein:
when the currently-browsed website is determined to have made an immediate transition from a search site, the keyword extraction function extracts a search keyword having been used in the search site before the transition to the currently-browsed website and used the extracted search keyword as the keyword;

when, the currently-browsed website is determined to have made the immediate transition from a non-search site, the keyword extraction function extracts at least one content keyword from contents acquired in the currently-browsed website and used the extracted at least one content keyword as the keyword;

the search site comprises at least one search engine; and
the keyword extraction function, and the providing function are implemented at a client.

12. The non-transitory computer-readable recording medium according to claim 11, wherein,
based on information about the currently-browsed website included in the browsing history information, the keyword extraction function acquires contents of the currently-browsed website and extracts the keyword from the acquired contents.

* * * * *